US011647260B2

(12) United States Patent
Richter et al.

(10) Patent No.: US 11,647,260 B2
(45) Date of Patent: *May 9, 2023

(54) CONTENT EVENT MAPPING

(71) Applicant: Apple Inc., Cupertino, CA (US)

(72) Inventors: Ian M. Richter, Los Angeles, CA (US);
Daniel Ulbricht, Sunnyvale, CA (US);
Eshan Verma, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/729,462

(22) Filed: Apr. 26, 2022

(65) Prior Publication Data
US 2022/0256249 A1 Aug. 11, 2022

Related U.S. Application Data

(63) Continuation of application No. 17/275,038, filed as application No. PCT/US2019/052582 on Sep. 24, 2019, now Pat. No. 11,343,589.

(60) Provisional application No. 62/737,550, filed on Sep. 27, 2018.

(51) Int. Cl.
G06V 20/20 (2022.01)
H04N 21/81 (2011.01)
G06T 19/00 (2011.01)
H04N 21/44 (2011.01)
H04N 21/845 (2011.01)

(52) U.S. Cl.
CPC ....... H04N 21/8133 (2013.01); G06T 19/006 (2013.01); G06V 20/20 (2022.01); H04N 21/44008 (2013.01); H04N 21/8456 (2013.01)

(58) Field of Classification Search
CPC ........ H04N 21/8133; H04N 21/44008; H04N 21/8456; G06V 20/20; G06T 19/006
See application file for complete search history.

(56) References Cited

U.S. PATENT DOCUMENTS 9,552,334 B1 * 1/2017 Meisels ................. G06Q 50/01
2012/0122491 A1 5/2012 Kim et al.
2015/0302651 A1 10/2015 Shpigelman
2016/0259497 A1 * 9/2016 Foss ..................... G06F 3/0481
2016/0307371 A1 10/2016 Ayers et al.

FOREIGN PATENT DOCUMENTS

WO WO-2014122884 A1 * 8/2014 ....... G08B 13/19608

OTHER PUBLICATIONS

PCT International Search Report and Written Opinion dated Dec. 9, 2019, International Application No. PCT/US2019/052582, pp. 1-15.

* cited by examiner

Primary Examiner — Thai Q Tran
Assistant Examiner — Jose M Mesa
(74) Attorney, Agent, or Firm — Fernando & Partners, LLP

(57) ABSTRACT

In one implementation, consumption of media content (such as video, audio, or text) is supplemented with an immersive synthesized reality (SR) map based on the media content. In various implementations described herein, the SR map includes a plurality of SR environment representations which, when selected by a user, cause display of a corresponding SR environment.

20 Claims, 20 Drawing Sheets

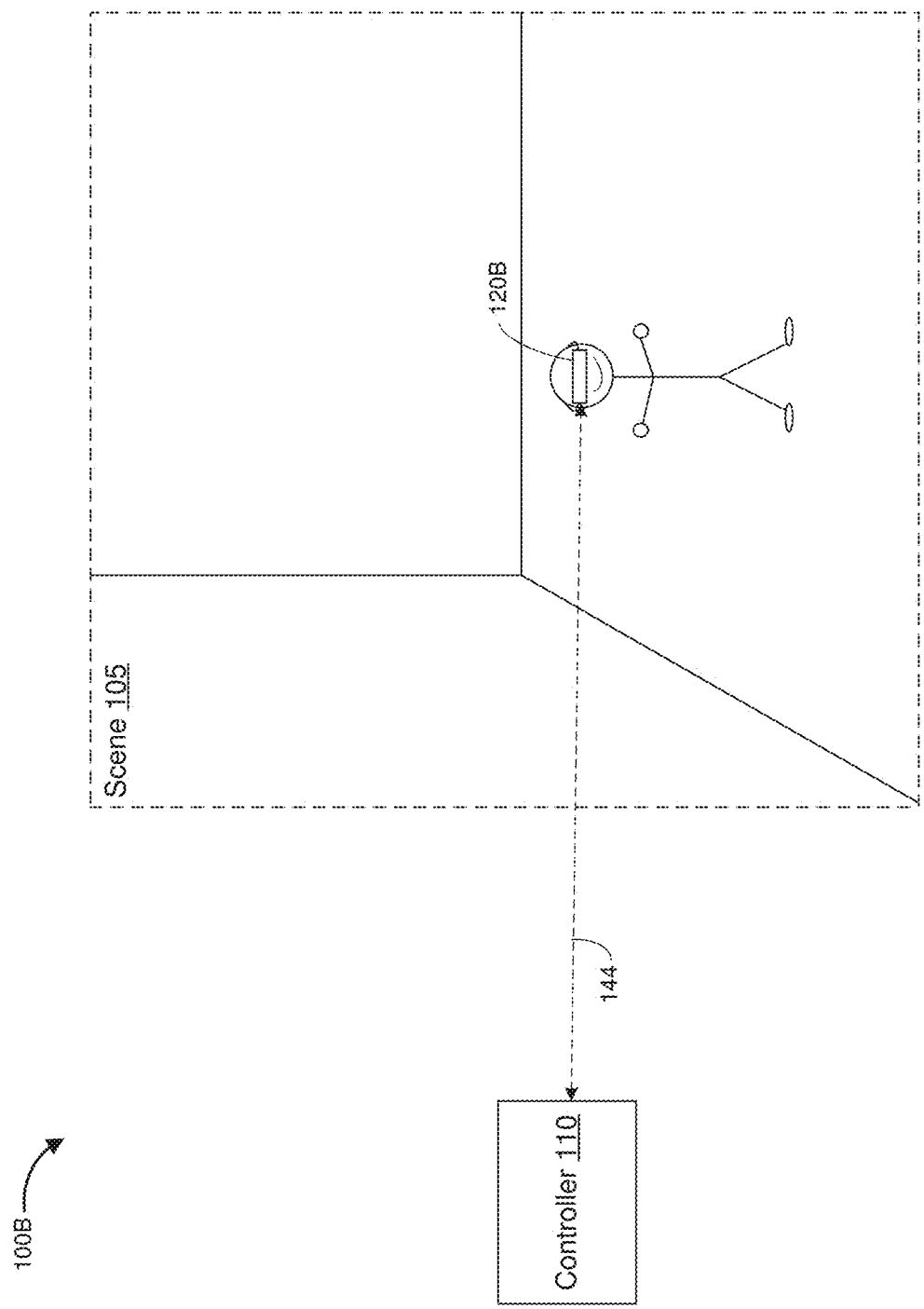

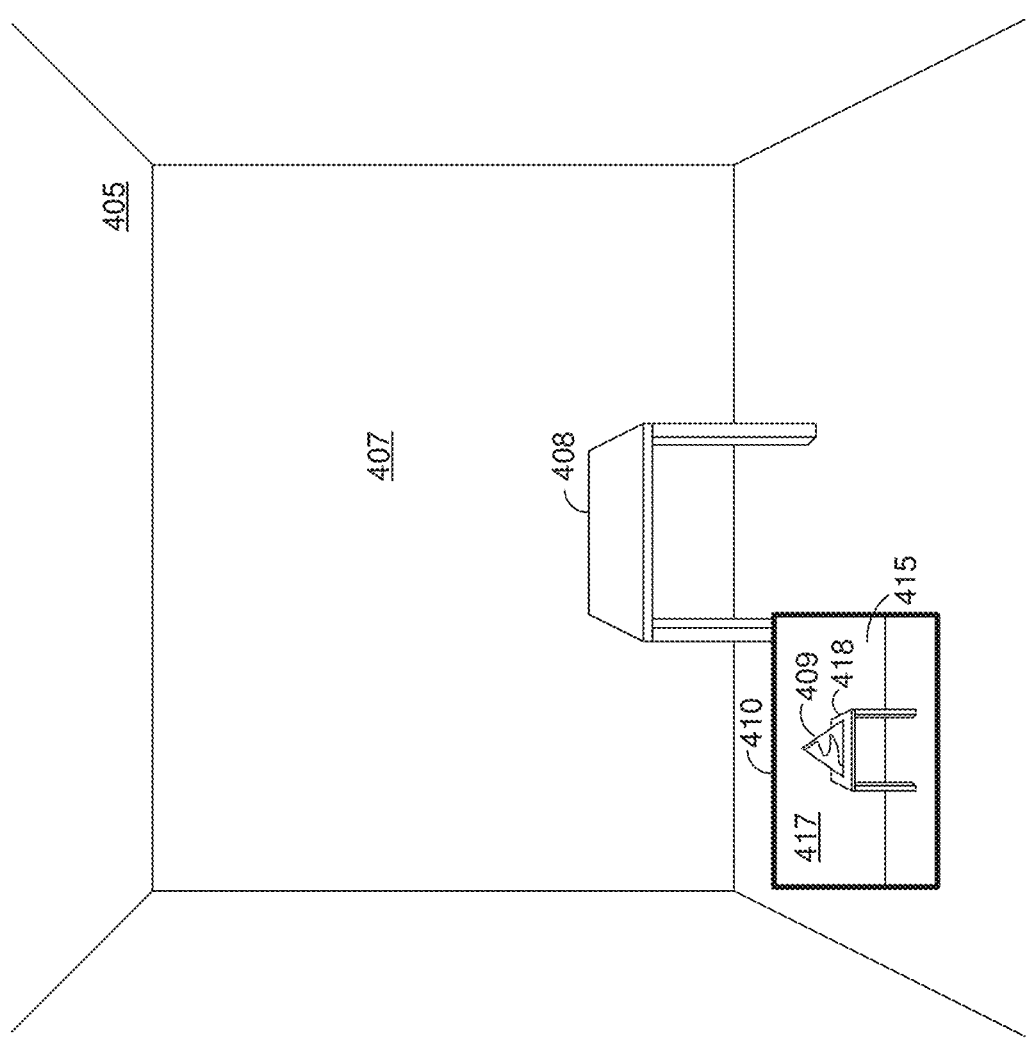

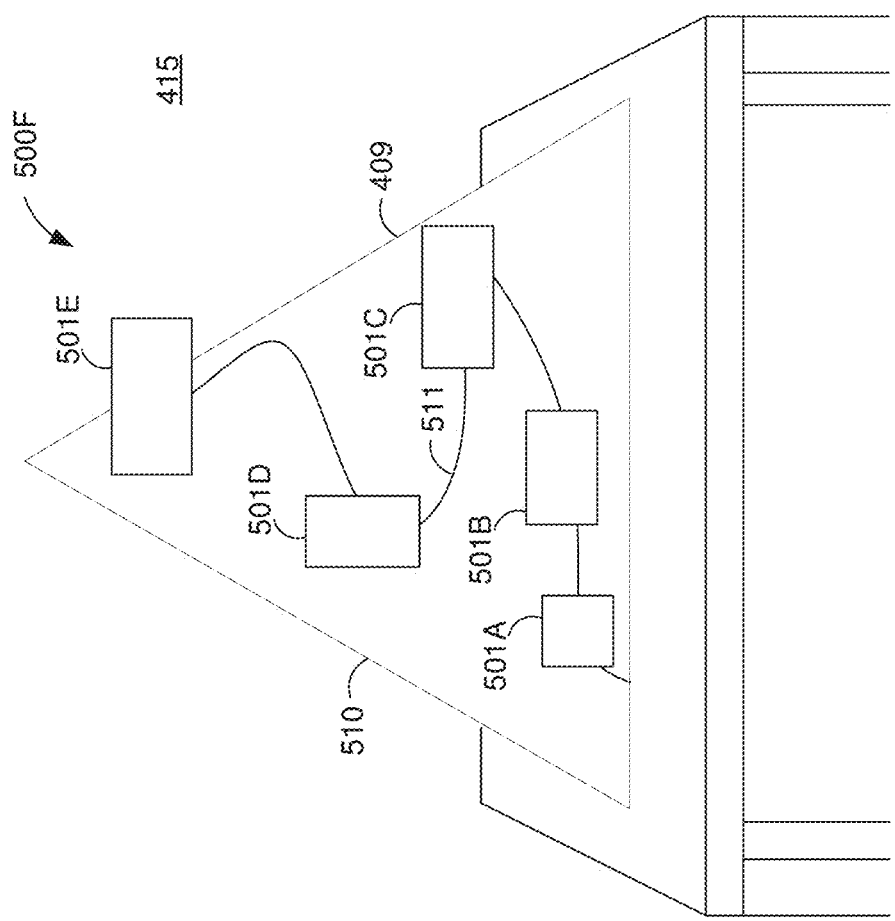

CONTENT EVENT MAPPING

CROSS-REFERENCE TO RELATED APPLICATIONS

This application is a continuation of U.S. patent application Ser. No. 17/275,038, filed on Mar. 10, 2021, which in the national phase entry of Intl. Patent App. No. PCT/US2019/052582, filed on Sep. 24, 2019, which claims priority to U.S. Provisional Patent App. No. 62/737,550, filed on Sep. 27, 2018, which are all incorporated hereby by reference in their entirety.

TECHNICAL FIELD

The present disclosure generally relates to generating a synthesized reality (SR) environment, and in particular, to systems, methods, and devices for generating a SR environment including a content event map.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a synthesized reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

In various implementations, traditional media content is supplemented with SR content to provide a more immersive user experience.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 1B is a block diagram of an example operating architecture in accordance with some implementations.

FIG. 4 illustrates a scene with an electronic device surveying the scene.

FIGS. 5A-5F illustrate a portion of the display of the electronic device of FIG. 4 displaying images of a representation of the scene including a first SR map.

Figure 1A:
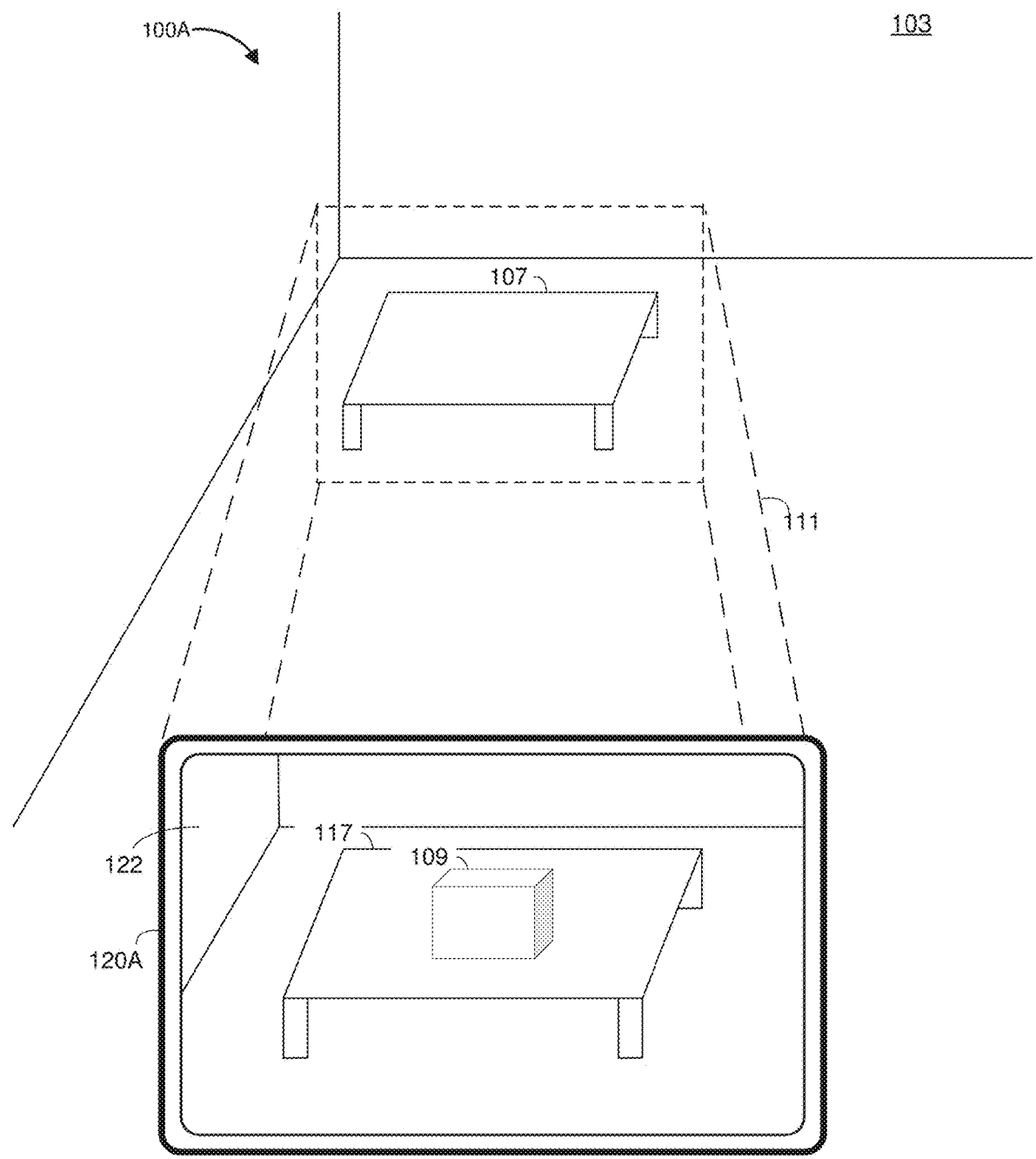
FIG. 1A is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating an SR map. In various implementations, the method is performed at a device including one or more processors and non-transitory memory. The method includes obtaining media content data characterized by a timeline, wherein the media content data includes event markers representing a plurality of events of a story arc. The method includes determining, from the media content data based on the event markers, a plurality of event definitions and a plurality of respective event times in the timeline corresponding to the plurality of events. The method includes obtaining, based on the plurality of event definitions, a plurality of SR environment representations. The method includes determining a path and a plurality of respective locations for the plurality of SR environment representations, wherein the path is defined by an ordered set of locations including the plurality of respective locations in an order based on the plurality of respective event times. The method includes displaying an SR map including the plurality of SR environment representations displayed at the plurality of respective locations, wherein each of the plurality of SR environment representations is associated with an affordance which, when selected, causes display of a respective SR environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

In various implementations, consumption of media content (such as video, audio, or text) is not truly immersive and/or is not tailored to a user environment. Accordingly, in various implementations described herein, traditional media content is supplemented with an immersive SR map based on the media content. In various implementations described herein, the SR map includes a plurality of SR environment representations which, when selected by a user, cause display of a corresponding SR environment.

FIG. 1A is a block diagram of an example operating architecture 100A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100A includes an electronic device 120A.

In some implementations, the electronic device 120A is configured to present SR content to a user. In some implementations, the electronic device 120A includes a suitable combination of software, firmware, and/or hardware. According to some implementations, the electronic device 120A presents, via a display 122, SR content to the user while the user is physically present within a physical environment 103 that includes a table 107 within the field-of-view 111 of the electronic device 120A. As such, in some implementations, the user holds the electronic device 120A in his/her hand(s). In some implementations, while providing augmented reality (AR) content, the electronic device 120A is configured to display an AR object (e.g., an AR cube 109) and to enable video pass-through of the physical environment 103 (e.g., including a representation 117 of the table 107) on a display 122.

FIG. 1B is a block diagram of an example operating architecture 100B in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100B includes a controller 110 and a head-mounted device (HMD) 120B.

In some implementations, the controller 110 is configured to manage and coordinate presentation of SR content for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120B via one or more wired or wireless communication channels 144 (e.g., BLUETOOTH, IEEE 802.11x, IEEE 802.16x, IEEE 802.3x, etc.). In another example, the controller 110 is included within the enclosure of the HMD 120B.

In some implementations, the HMD 120B is configured to present the SR content to the user. In some implementations, the HMD 120B includes a suitable combination of software, firmware, and/or hardware. The HMD 120B is described in greater detail below with respect to FIG. 3. In some implementations, the functionalities of the controller 110 are provided by and/or combined with the HMD 120B.

According to some implementations, the HMD 120B presents SR content to the user while the user is virtually and/or physically present within the scene 105.

In some implementations, the user wears the HMD 120B on his/her head. As such, the HMD 120B includes one or more SR displays provided to display SR content. For example, in various implementations, the HMD 120B encloses the field-of-view of the user. In some implementations, such as in FIG. 1A, the HMD 120B is replaced with a handheld device (such as a smartphone or tablet) configured to present SR content, and rather than wearing the HMD 120B the user holds the device with a display directed towards the field-of-view of the user and a camera directed towards the scene 105. In some implementations, the handheld device can be placed within an enclosure that can be worn on the head of the user. In some implementations, the HMD 120B is replaced with a SR chamber, enclosure, or room configured to present SR content in which the user does not wear or hold the HMD 120B.

Figure 2:
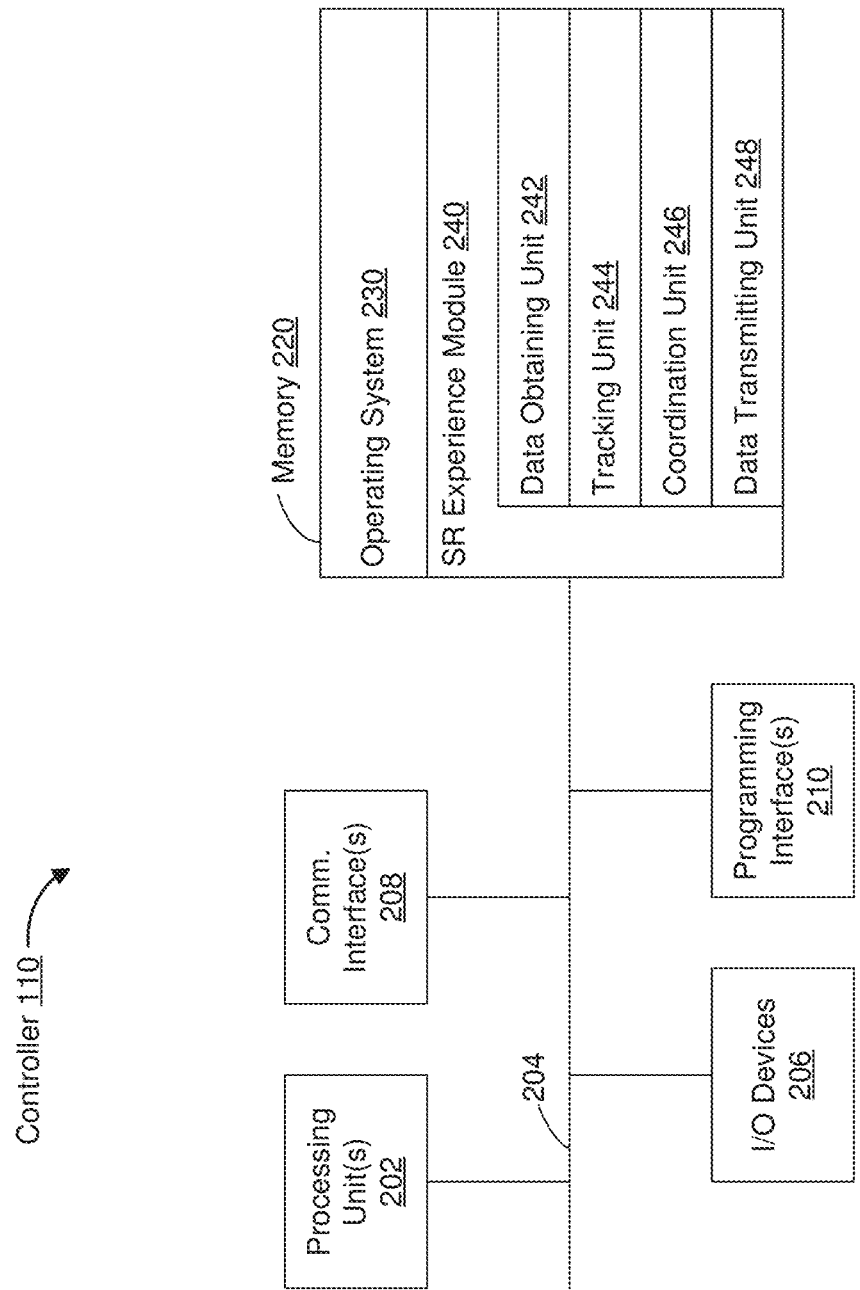
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and a SR experience module 240.

The operating system 230 includes procedures for handling various basic system services and for performing hardware dependent tasks. In some implementations, the SR experience module 240 is configured to manage and coordinate one or more SR experiences for one or more users (e.g., a single SR experience for one or more users, or multiple SR experiences for respective groups of one or more users). To that end, in various implementations, the SR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120B of FIG. 1B. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120B with respect to the scene 105 of FIG. 1B. To that end, in various implementations, the tracking unit 244 includes instructions and/or logic therefor, and heuristics and metadata therefor.

In some implementations, the coordination unit 246 is configured to manage and coordinate the SR experience presented to the user by the HMD 120B. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120B. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
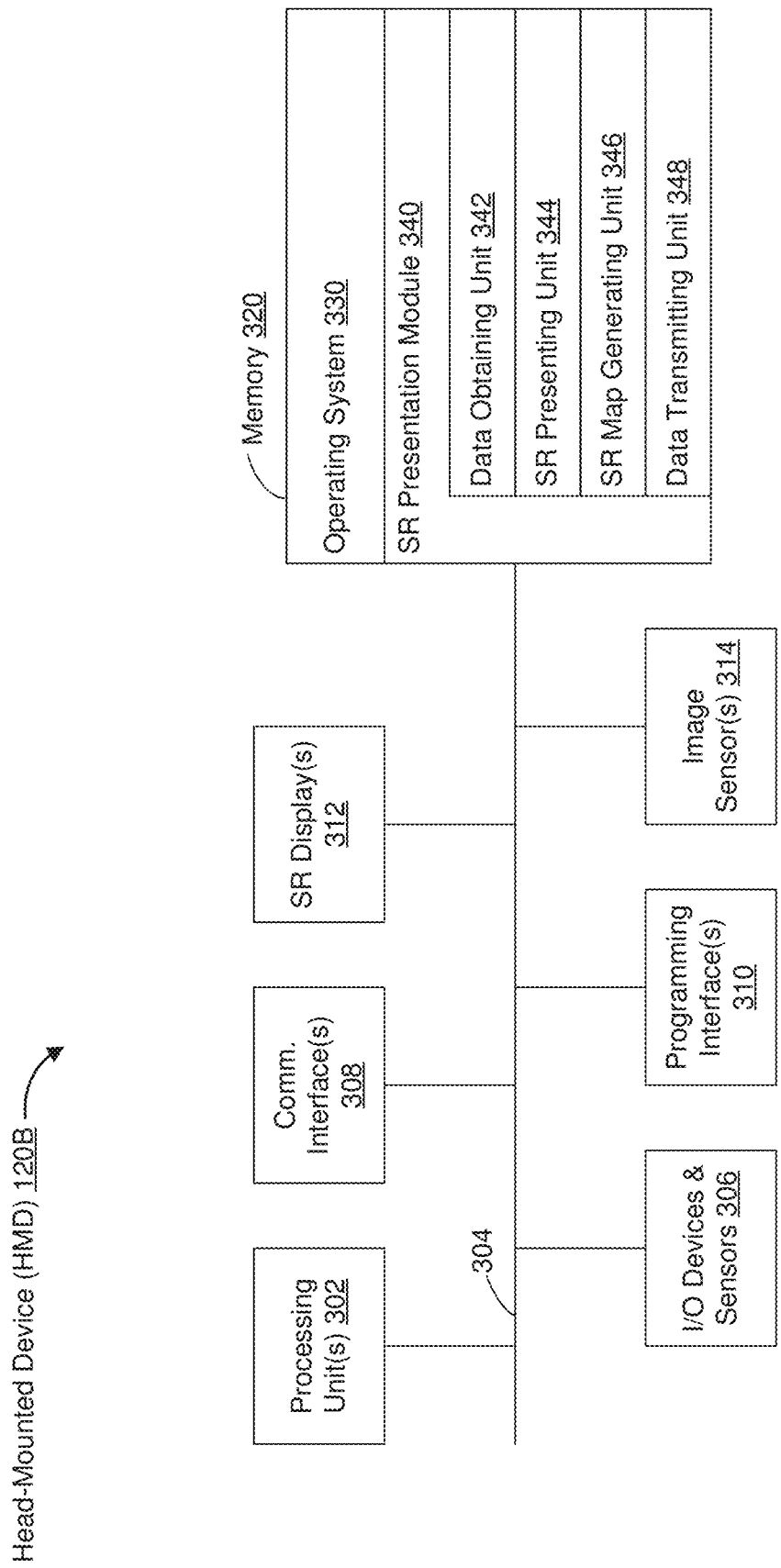
FIG. 3 is a block diagram of an example head-mounted device (HMD) in accordance with some implementations.

FIG. 3 is a block diagram of an example of the HMD 120B in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120B includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more SR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more SR displays 312 are configured to present SR content to the user. In some implementations, the one or more SR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more SR displays 312 correspond to diffractive, reflective, polarized, holographic, etc. waveguide displays. For example, the HMD 120B includes a single SR display. In another example, the HMD 120B includes an SR display for each eye of the user. In some implementations, the one or more SR displays 312 are capable of presenting MR and/or VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the scene as would be viewed by the user if the HMD 120B was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an SR presentation module 340.

The operating system 330 includes procedures for handling various basic system services and for performing hardware dependent tasks. In some implementations, the SR presentation module 340 is configured to present SR content to the user via the one or more SR displays 312. To that end, in various implementations, the SR presentation module 340 includes a data obtaining unit 342, an SR presenting unit 344, an SR map generating unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the SR presenting unit 344 is configured to present SR content via the one or more SR displays 312. To that end, in various implementations, the SR presenting unit 344 includes instructions and/or logic therefor, and heuristics and metadata therefor.

In some implementations, the SR map generating unit 346 is configured to generate an SR map based on media content data. To that end, in various implementations, the SR map generating unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the SR presenting unit 344, the SR map generating unit 346, and the data transmitting unit 348 are shown as residing on a single device (e.g., the HMD 120B of FIG. 1B), it should be understood that in other implementations, any combination of the data obtaining unit 342, the SR presenting unit 344, the SR map generating unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4 illustrates a scene 405 with an electronic device 410 surveying the scene 405. The scene 405 includes a table 408 and a wall 407.

The electronic device 410 displays, on a display, a representation of the scene 415 including a representation of the table 418 and a representation of the wall 417. In various implementations, the representation of the scene 415 is generated based on an image of the scene captured with a scene camera of the electronic device 410 having a field-of-view directed toward the scene 405. The representation of the scene 415 further includes an SR map 409 displayed on the representation of the table 418.

As the electronic device 410 moves about the scene 405, the representation of the scene 415 changes in accordance with the change in perspective of the electronic device 410. Further, the SR map 409 correspondingly changes in accordance with the change in perspective of the electronic device 410. Accordingly, as the electronic device 410 moves, the SR map 409 appears in a fixed relationship with respect to the representation of the table 418.

In various implementations, the SR map 409 corresponds to media content data characterized by a timeline such that, at various times, corresponding portions of the media content data are to be presented. In some embodiments, the media content data includes video content data characterized by a timeline such that, at various times, corresponding images are to be displayed while, optionally, sound corresponding to the corresponding images is concurrently played. In some embodiments, the media content data includes audio content data in which corresponding sound is to be played at corresponding times. In various implementations, the audio content data includes music and/or spoken word narration. In some embodiments, the media content data includes text content data characterized by a timeline either by virtue of the character position of the various portions of text in the text content data or the estimated text-to-speech time (if read by a text-to-speech module) of the various portions of text in the text content data.

The media content data includes event markers representing a plurality of events of a story arc. In various implementations, the event markers are portions of the media content data meeting event marker criteria. In various implementations, the event markers are detected by image analysis of video content data. For example, in some embodiments, the event marker criteria include a criterion that is met when an object is present in an image of the video content data (e.g., a building, a skyline, or a planet). In some embodiments, the event marker criteria include a criterion that is met when the color palette of an image is significantly different than a previous image (e.g., indicating a scene change).

In various implementations, the event markers are detected by audio analysis of audio content data (or the audio component of video content data). For example, in some embodiments, the event marker criteria include a criterion that is met when a musical cue is present. In some embodiments, the event marker criteria include a criterion that is met when the volume of the audio breaches a threshold or a rate of change of the volume breaches a threshold.

In various implementations, the event markers are detected by textual analysis of text content data (or text recognized from audio content data or the audio component of video content data). For example, in some embodiments, the event marker criteria include a criterion that is met when certain words are present (e.g., one or more words meeting event marker word criteria).

Figure 5A:
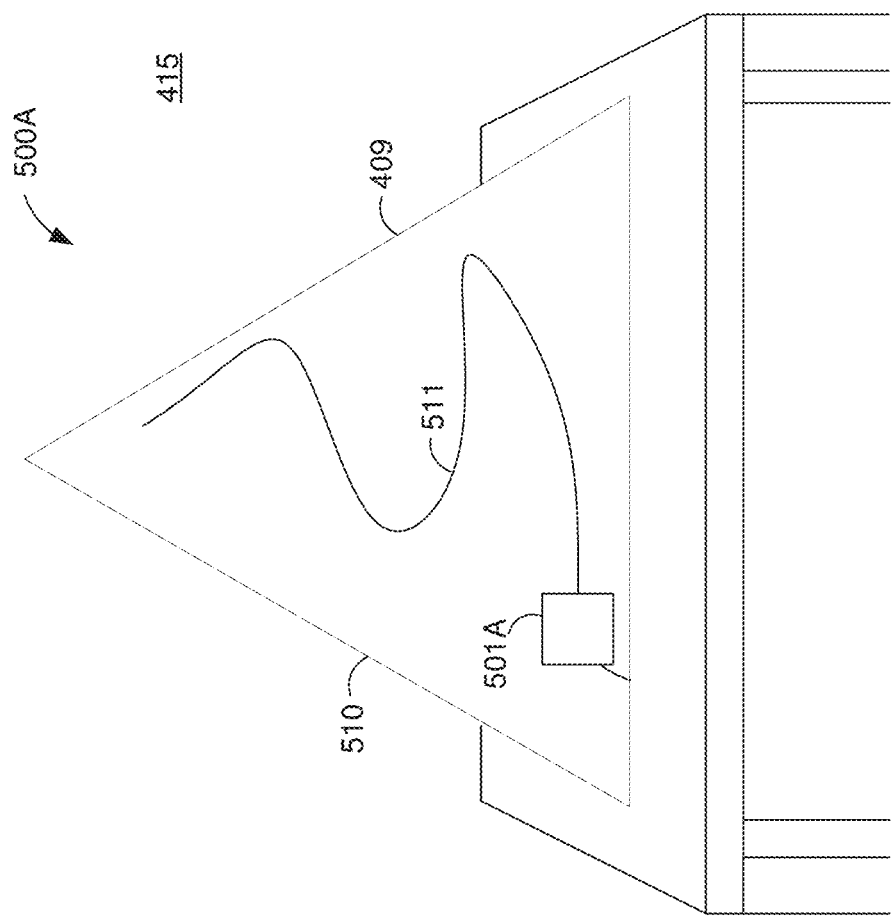

FIG. 5A illustrates a portion of the display of the electronic device 410 displaying, at a first time, a first image 500A of the representation of the scene 415 including the SR map 409. In various implementations, the first image 500A is displayed concurrently with the playback of the media content data (or an audio component thereof) and the first image 500A is displayed at a first time in a timeline of the media content data corresponding to a first event marker representing a first event of the story arc.

In FIG. 5A, the SR map 409 includes a SR map representation 510 (a representation of a mountain) with a path representation 511 (a representation of a footpath winding up the mountain). In various implementations, the SR map representation 510 is a default SR map representation or an SR map representation selected by a user. In various implementations, the SR map representation 510 is obtained based on the media content data. For example, in some embodiments, the SR map representation 510 is selected from a plurality of stored SR map representations based on the media content data. In some embodiments, the SR map representation 510 is generated based on the media content data (e.g., from an image in the media content data, such as a map detected in an image of the media content data).

The SR map 409 includes a first SR environment representation 501A (e.g., a representation of a house) displayed along the path representation 511. In various implementations, the first SR environment representation 501A is obtained based on the media content data, in particular, the portion of the media content data associated with the first event (e.g., a location associated with the first event). For example, in some embodiments, the first SR environment representation 501A is selected from a plurality of stored SR environment representations based on the portion of the media content data associated with the first event. As another example, in some embodiments, the first SR environment representation 501A is generated based on the portion of the media content data associated with the first event, for example, based on one or more images of a location in the portion of the media content data associated with the first event.

Figure 5B:
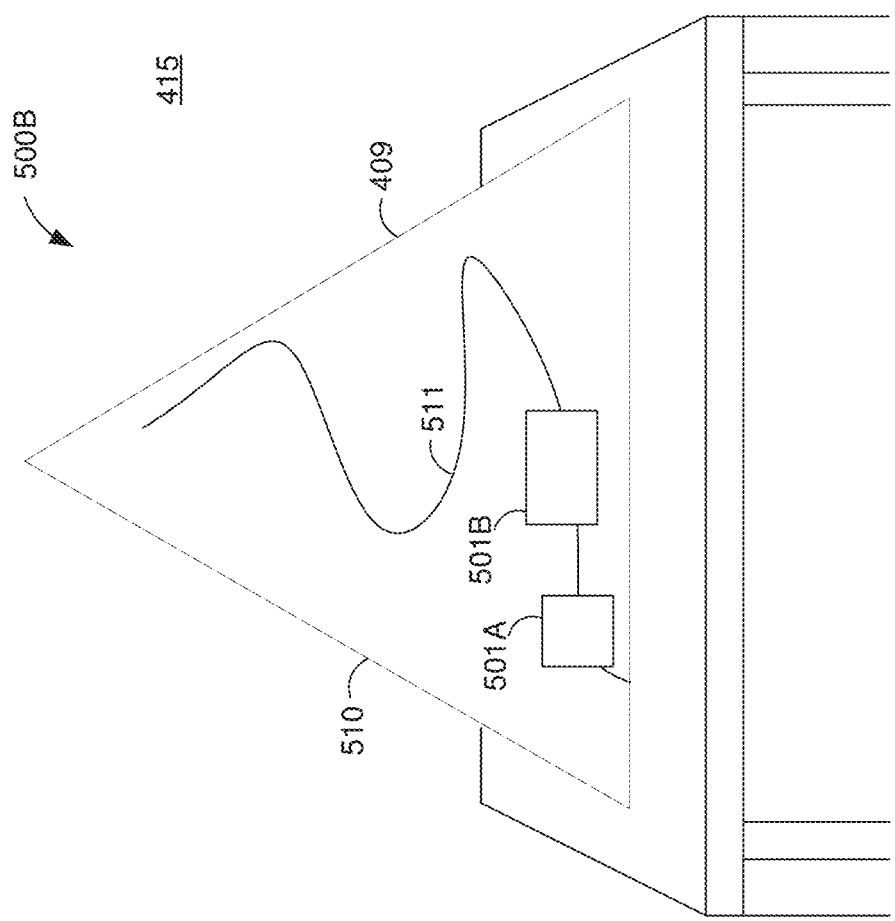

FIG. 5B illustrates a portion of the display of the electronic device 410 displaying, at a second time, a second image 500B of the representation of the scene 415 including the SR map 409. In various implementations, the second image 500B is displayed concurrently with the playback of the media content data (or an audio component thereof) and the second image SR is displayed at a second time in a timeline of the media content data corresponding to a second event marker representing a second event of the story arc.

As compared to FIG. 5A, the SR map 409 further includes a second SR environment representation 501B (e.g., a representation of a school) displayed further along the path representation 511. In various implementations, the second SR environment representation 501B is obtained in a similar manner to the first SR environment representation 501A.

Figure 5C:
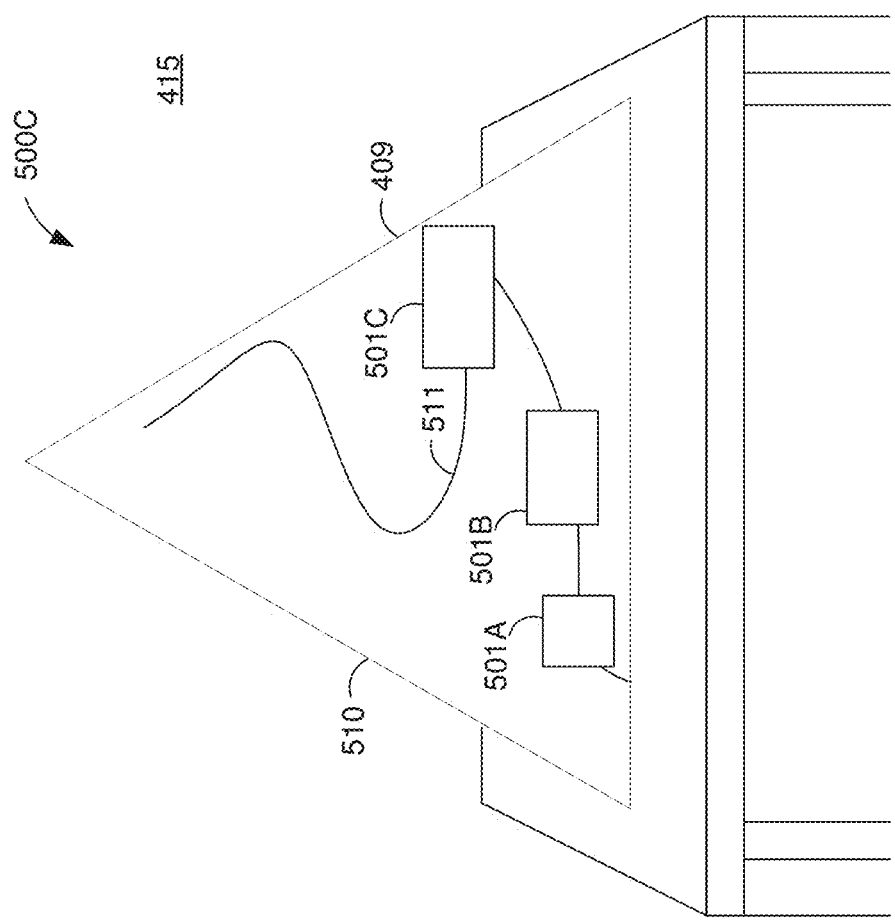

FIG. 5C illustrates a portion of the display of the electronic device 410 displaying, at a third time, a third image 500C of the representation of the scene 415 including the SR map 409. In various implementations, the third image 500C is displayed concurrently with the playback of the media content data (or an audio component thereof) and the third image 500C is displayed at a third time in a timeline of the media content data corresponding to a third event marker representing a third event of the story arc.

As compared to FIG. 5B, the SR map 409 further includes a third SR environment representation 501C (e.g., a representation of the Parthenon) displayed further along the path representation 511. In various implementations, the third SR environment representation 501C is obtained in a similar manner to the first SR environment representation 501A.

The third SR environment representation 501C is associated with a third affordance which, when selected, causes display of a third SR environment. Similarly, the first SR environment representation 501A is associated with a first affordance which, when selected, causes display of a first SR environment and the second SR environment representation 501B is associated with a second affordance which, when selected, causes display of a second SR environment.

Figure 5D:
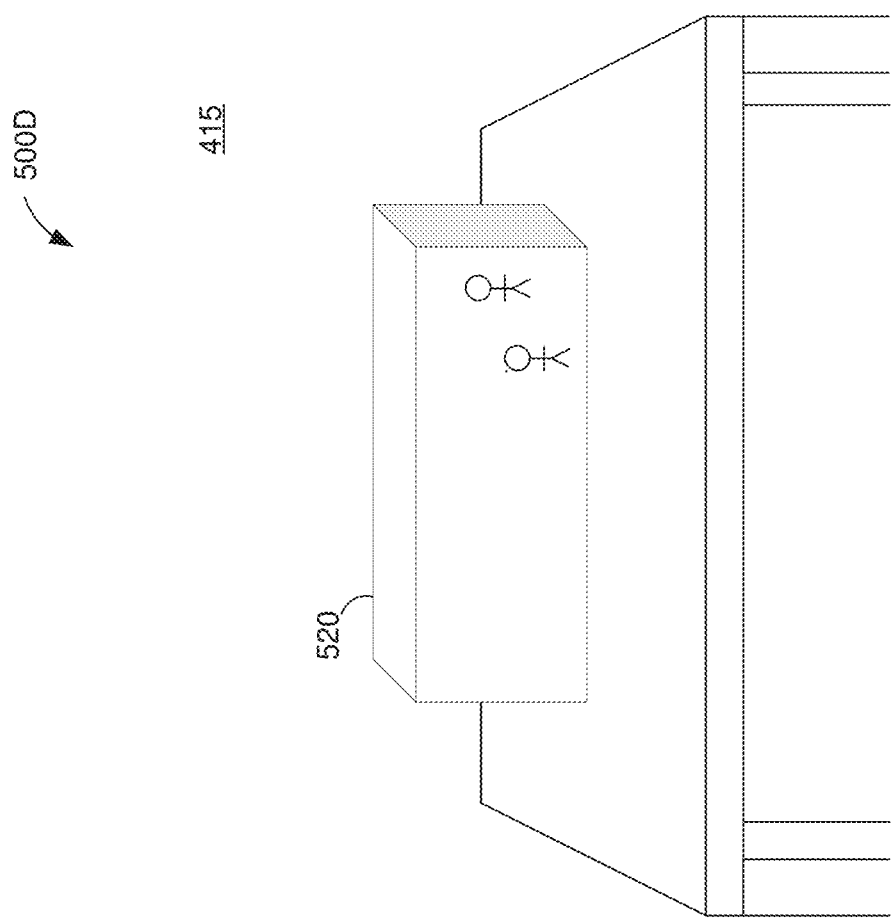

FIG. 5D illustrates a portion of the display of the electronic device 410 displaying, at a fourth time and in response to detecting selection of the third affordance, a fourth image 500D of the representation of the scene 415 including a third SR environment 520. In various implementations, the third SR environment 520 is obtained in a similar manner to the third SR environment representation 501C.

In various implementations, the third SR environment 520 includes a representation of a location and further includes virtual objects corresponding to the media content data. For example, in some embodiments, the third SR environment 520 is populated with virtual objects corresponding to the portion of the media content data associated with the third event, for example, based on one or more images of people or objects in the portion of the media content data associated with the third event.

In various implementations, in response to detecting selection of the third affordance, the SR map 409 ceases to be displayed. In various implementations, in response to detecting selection of the third affordance, concurrent playback of the media content data is paused. However, in various implementations, in response to detecting selection of the third affordance, concurrent playback of the media content data continues.

In response to a user selection to return to the SR map 409, either via a gesture or selection of a back affordance in the third SR environment 520, the third SR environment 520 ceases to be displayed (and, if hidden, the SR map 409 is redisplayed).

Figure 5E:
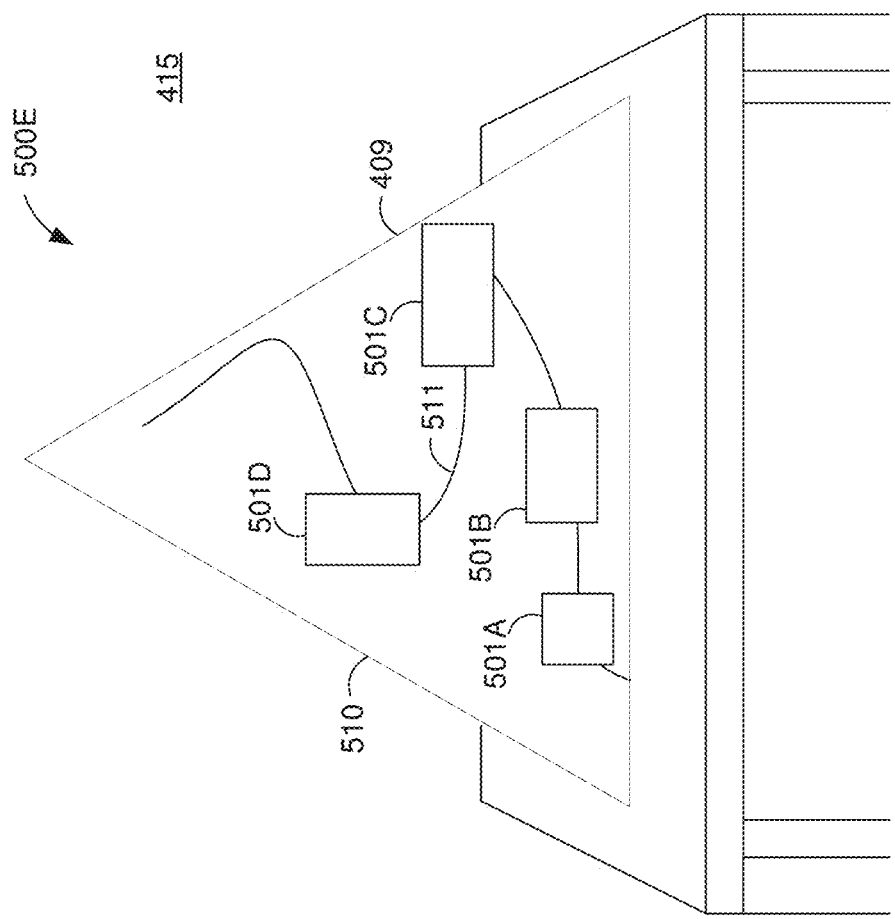

FIG. 5E illustrates a portion of the display of the electronic device 410 displaying, at a fifth time, a fifth image 500E of the representation of the scene 415 including the SR map 409. In various implementations, the fifth image 500E is displayed concurrently with the playback of the media content data (or an audio component thereof) and the fifth image 500E is displayed at a fourth time in a timeline of the media content data corresponding to a fourth event marker representing a fourth event of the story arc.

As compared to FIG. 5C, the SR map 409 further includes a fourth SR environment representation 501D (e.g., a representation of a skyscraper) displayed further along the path representation 511. In various implementations, the fourth SR environment representation 501D is obtained in a similar manner to the first SR environment representation 501A.

FIG. 5F illustrates a portion of the display of the electronic device 410 displaying, at a sixth time, a sixth image 500F of the representation of the scene 415 including the SR map 409. In various implementations, the sixth image 500F is displayed concurrently with the playback of the media content data (or an audio component thereof) and the sixth image 500F is displayed at a fifth time in a timeline of the media content data corresponding to a fifth event marker representing a fifth event of the story arc.

As compared to FIG. 5E, the SR map 409 further includes a fifth SR environment representation 501E (e.g., a representation of the Capitol Building) displayed further along the path representation 511. In various implementations, the fifth SR environment representation 501E is obtained in a similar manner to the first SR environment representation 501A.

As an illustrative example, FIGS. 5A-5F correspond to an SR map associated with media content data including video content data of an interview of a senator by a journalist taking place on a hiking trail. Based on analysis of the video data, a device detects the scene as a hiking trail and selects an SR map representation 510 of a mountain. At a first time in the interview, the senator discusses his humble beginnings growing up in a small one-bedroom home with two younger siblings. The device detects the spoken words "one-bedroom home" and selects the first SR environment representation 501A of a small house to be displayed along the path representation 511 at the first time. At a second time in the interview, the senator discusses his high school football career at the local school and the video includes images of the school. The device detects the spoken words "high school" and generates the second SR environment representation 501B of the local school to be displayed along the path representation 511 at the second time. At a third time in the interview, the senator discusses studying abroad in Greece and being impressed by the grandeur of the Parthenon. The device detects the spoken words "Parthenon" and selects the third SR environment representation 501C of the Parthenon to be displayed along the path representation 511 at the third time. At a fourth time in the interview, the senator discusses working at a prestigious law firm in New York. The device detects the spoken words "working," "law firm," and "New York" and selects the fourth SR environment representation 501D of a skyscraper to be displayed along the path representation 511 at the fourth time. At a fifth time in the interview, the senator discusses his election to the U.S. Senate. The device detects the spoken words "election" and "senate" and selects the fifth SR environment representation 501E of the Capitol Building to be displayed along the path representation 511 at the fifth time.

While concurrently playing the media content data, the device displays the SR map 409 including the SR map representation 510. At the corresponding times, the device displays the SR map 409 including the corresponding SR representations 501A-501E.

Figure 6:
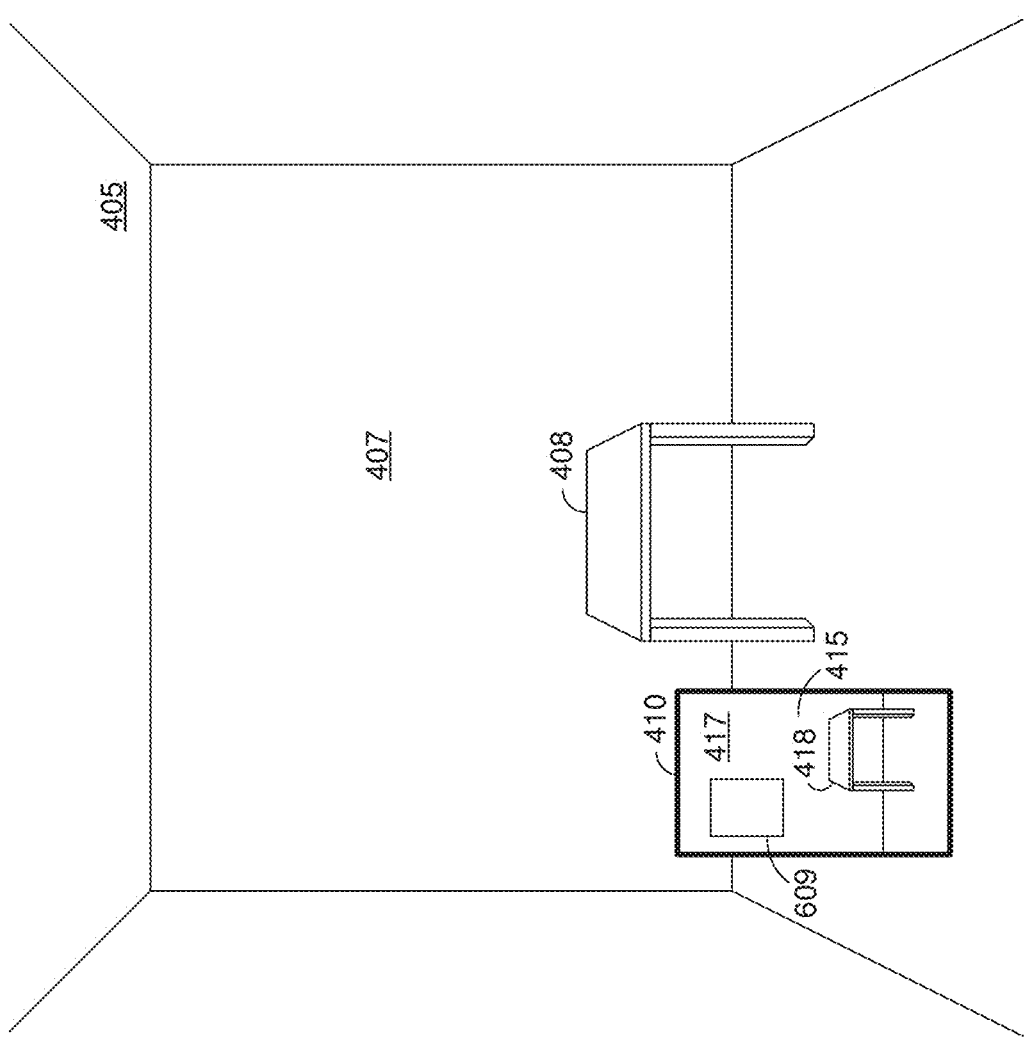
FIG. 6 illustrates the scene of FIG. 4 with the electronic device surveying the scene.

FIG. 6 illustrates the scene 405 of FIG. 4 with the electronic device 410 surveying the scene 405. As noted above, the scene 405 includes a table 408 and a wall 407.

In FIG. 6, the electronic device 410 displays, on a display, a representation of the scene 415 including a representation of the table 418 and a representation of the wall 417. In various implementations, the representation of the scene 415 is generated based on an image of the scene captured with a scene camera of the electronic device 410 having a field-of-view directed toward the scene 405. The representation of the scene 415 further includes an SR map 609 displayed on the representation of the wall 417.

As the electronic device 410 moves about the scene 405, the representation of the scene 415 changes in accordance with the change in perspective of the electronic device 410. Further, the SR map 609 correspondingly changes in accordance with the change in perspective of the electronic device 410. Accordingly, as the electronic device 410 moves, the SR map 609 appears in a fixed relationship with respect to the representation of the wall 417.

Like the SR map 409 of FIG. 4, in various implementations, the SR map 609 corresponds to media content data characterized by a timeline. The media content data includes event markers representing a plurality of events of a story arc.

Figure 7A:
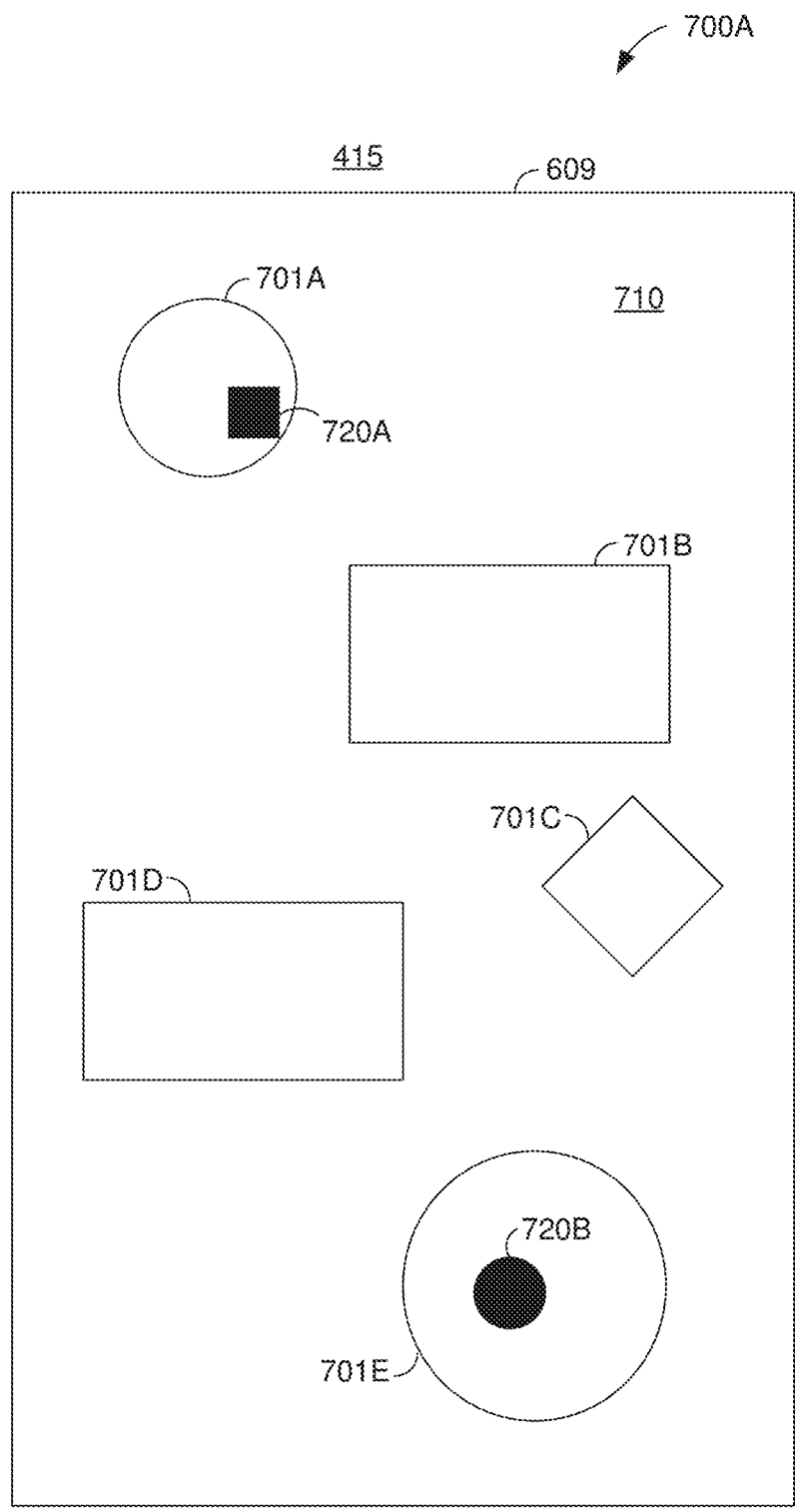
FIGS. 7A-7E illustrate a portion of the display of the electronic device of FIG. 4 displaying images of a representation of the scene including a second SR map.

FIG. 7A illustrates a portion of the display of the electronic device 410 displaying, at a first time, a first image 700A of the representation of the scene 415 including the SR map 609.

In FIG. 7A, the SR map 609 includes an SR map representation 710 (a representation of a paper map). In various implementations, the SR map representation 710 is a default SR map representation or an SR map representation selected by a user. In various implementations, the SR map representation 710 is obtained based on the media content data. For example, in some embodiments, the SR map representation 710 is selected from a plurality of stored SR map representations based on the media content data. In some embodiments, the SR map representation 710 is generated based on the media content data (e.g., from an image in the media content data, such as a map detected in an image of the media content data).

Whereas, at the first time illustrated in FIG. 5A, the SR map 409 includes only the first SR environment representation 501A, at the first time illustrated in FIG. 7A, the SR map 609 includes a plurality of SR environment representations 701A-701E. The plurality of SR environment representations 701A-701E includes a first SR environment representation 701A, a second SR environment representation 701B, a third SR environment representation 701C, a fourth SR environment representation 701D, and a fifth SR environment representation 701E. At least one of the plurality of SR environment representations 701A-701E is associated with an affordance which, when selected, causes display of a respective SR environment. In some embodiments, each of the plurality of SR environment representations is associated with an affordance which, when selected, causes display of a respective SR environment.

In various implementations, each of the plurality of SR environment representations 701A-701E is obtained in a similar manner to the first SR environment representation 501A of FIG. 5A.

The SR map 609 includes a first object representation 720A displayed at the location of the first SR environment representation 701A and a second object representation 720B displayed at the location of the fifth SR environment representation 701E. In various implementations, the first object representation 720A represents a first character, vehicle, or prop of the media content data. In various implementations, the first object representation 720A is obtained based on the media content data. Similarly, the second object representation 720B represents a second character, vehicle, or prop of the media content data. In various implementations, the second object representation 720A is obtained based on the media content data.

Figure 7B:
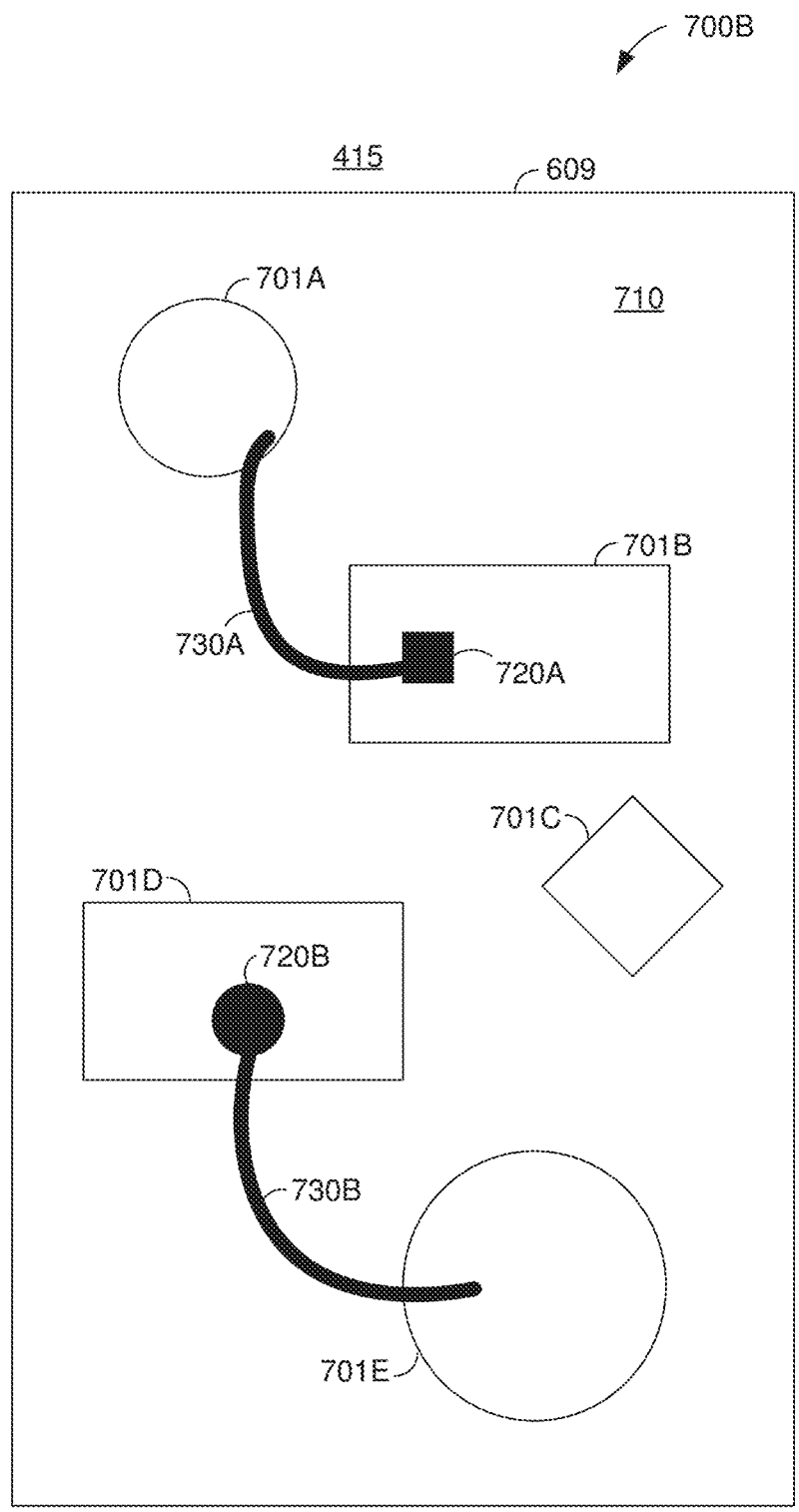

FIG. 7B illustrates a portion of the display of the electronic device 410 displaying, at a second time, a second image 700B of the representation of the scene 415 including the SR map 609.

In FIG. 7B, the first object representation 720A is displayed at the location of the second SR environment representation 701B and the second object representation 720B is displayed at the location of the fourth SR environment representation 701D. Further, the SR map 609 includes a first path representation 730A between the first SR environment representation 701A and the second SR environment representation 701B indicating that the first object representation 720A has moved from the first SR environment representation 701A to the second SR environment representation 701B. The SR map 609 includes a second path representation 730B between the fifth SR environment representation 701E and the fourth SR environment representation 701D indicating that the second object representation 720B has moved from the fifth SR environment representation 701E to the fourth SR environment representation 701D.

Figure 7C:
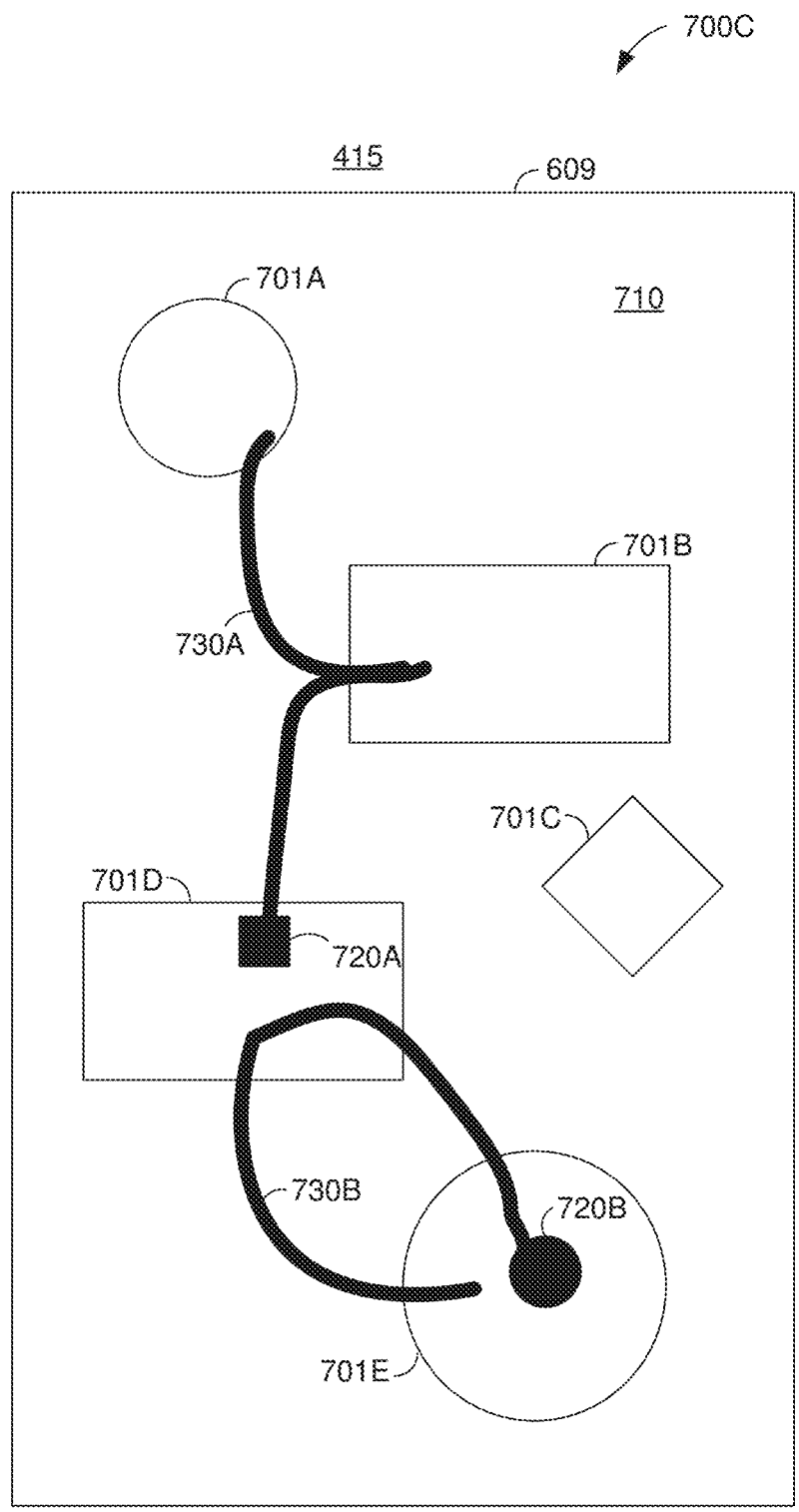

FIG. 7C illustrates a portion of the display of the electronic device 410 displaying, at a third time, a third image 700C of the representation of the scene 415 including the SR map 609.

In FIG. 7C, the first object representation 720A is displayed at the location of the fourth SR environment representation 701D and the second object representation 720B is displayed at the location of the fifth SR environment representation 701E. Further, the first path representation 730A is extended to include a portion between the second SR environment representation 701B and the fourth SR environment representation 701D indicating that the first object representation 720A has moved from the second SR environment representation 701B to the fourth SR environment representation 701D. The second path representation 730B is extended to include a portion between the fourth SR environment representation 701D and the fifth SR environment representation 701E indicating that the second object representation 720B has moved from the fourth SR environment representation 701D to the fifth SR environment representation 701E.

Figure 7D:
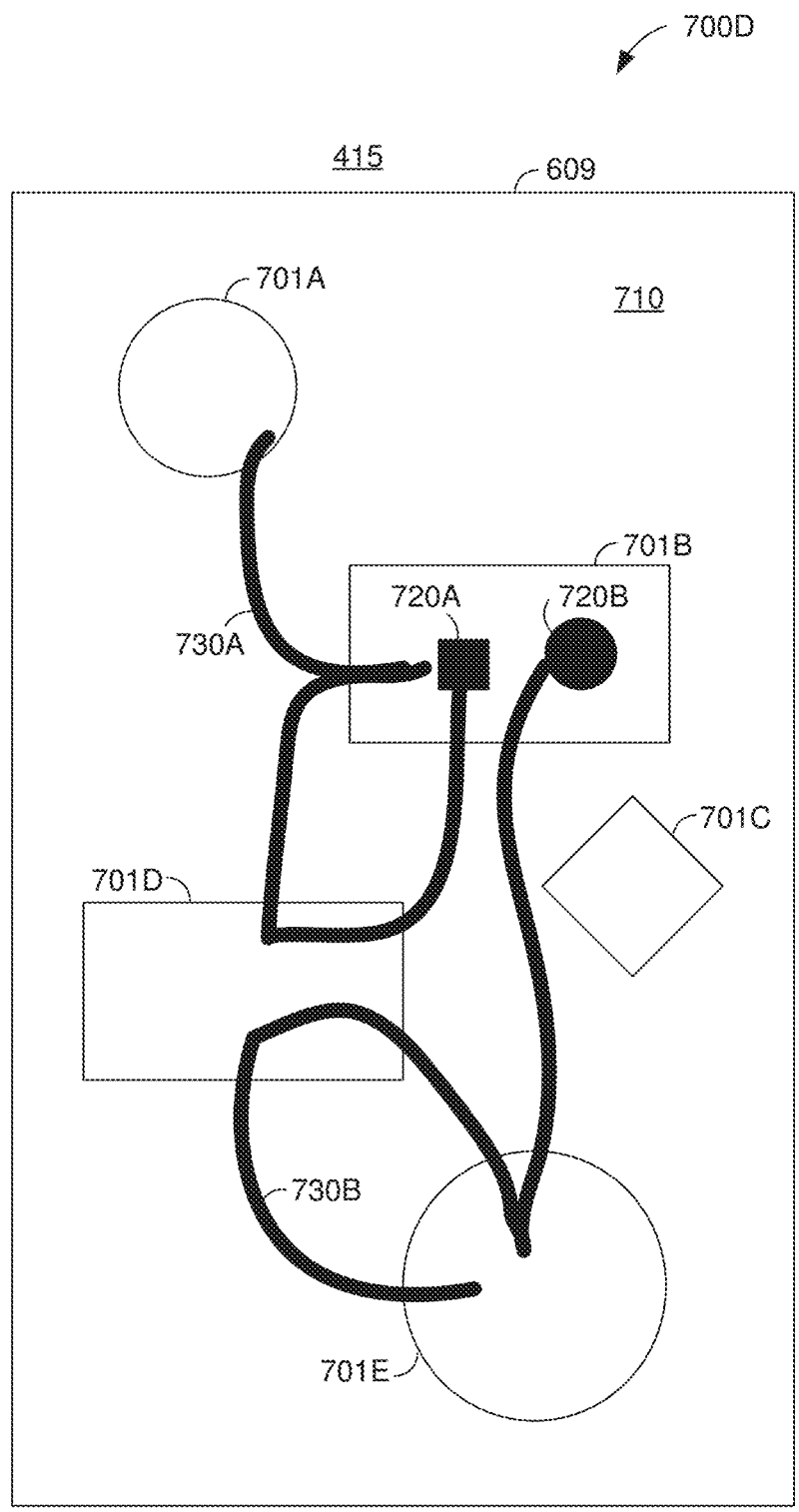

FIG. 7D illustrates a portion of the display of the electronic device 410 displaying, at a fourth time, a fourth image 700D of the representation of the scene 415 including the SR map 609.

In FIG. 7D, the first object representation 720A is displayed at the location of the second SR environment representation 701B and the second object representation 720B is also displayed at the location of the second SR environment representation 701B. Further, the first path representation 730A is extended to include a portion between the fourth SR environment representation 701D and the second SR environment representation 701B indicating that the first object representation 720A has moved from the fourth SR environment representation 701D to the second SR environment representation 701B. The second path representation 730B is extended to include a portion between the fifth SR environment representation 701E and the second SR environment representation 701B indicating that the second object representation 720B has moved from the fifth SR environment representation 701E to the second SR environment representation 701B.

Figure 7E:
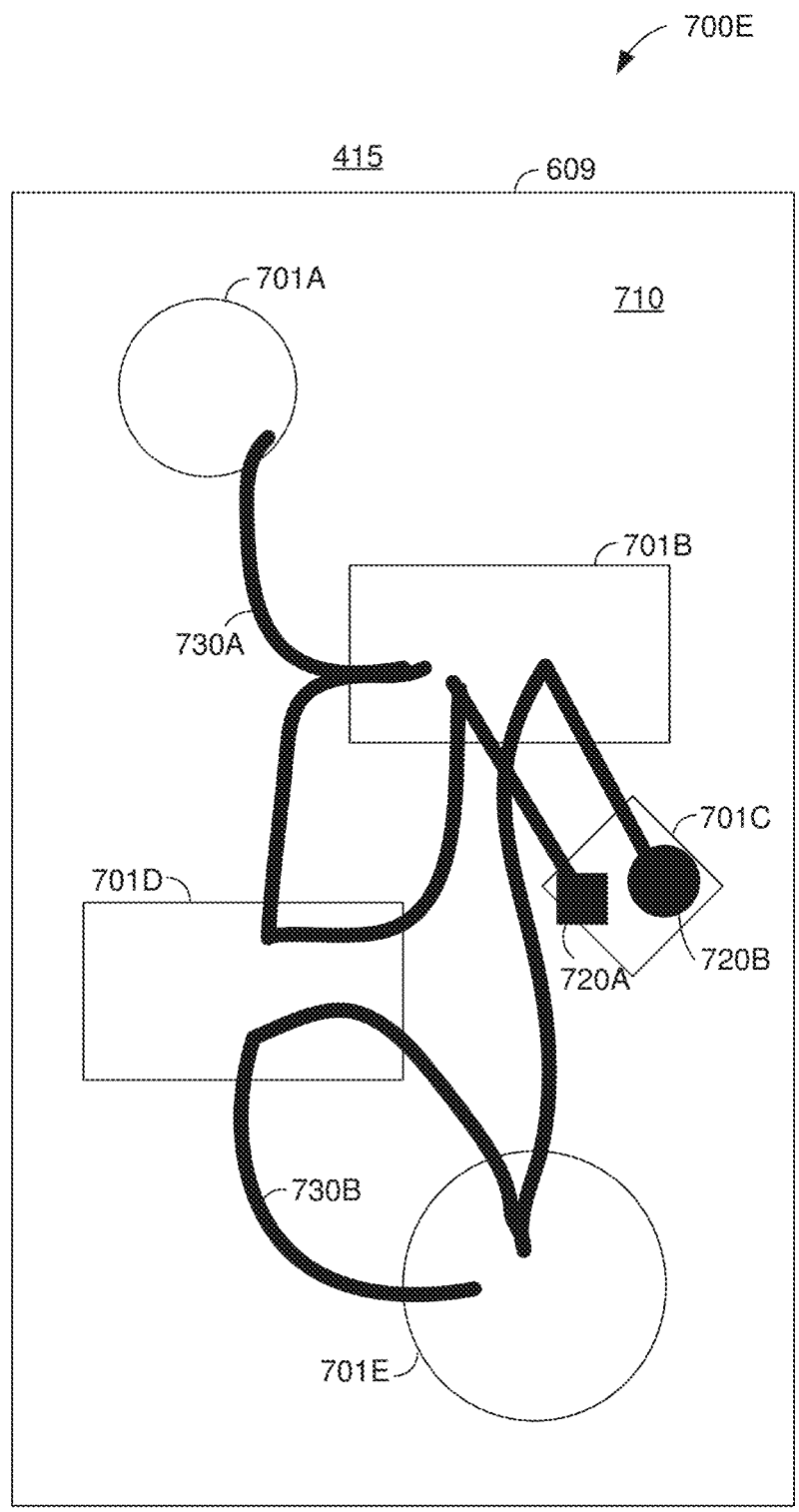

FIG. 7E illustrates a portion of the display of the electronic device 410 displaying, at a fifth time, a fifth image 700E of the representation of the scene 415 including the SR map 609.

In FIG. 7E, the first object representation 720A is displayed at the location of the third SR environment representation 701C and the second object representation 720B is also displayed at the location of the third SR environment representation 701C. Further, the first path representation 730A is extended to include a portion between the second SR environment representation 701B and the third SR environment representation 701C indicating that the first object representation 720A has moved from the second SR environment representation 701B to the third SR environment representation 701C. The second path representation 730B is extended to include a portion between the second SR environment representation 701B and the third SR environment representation 701C indicating that the second object representation 720B has also moved from the second SR environment representation 701B to the third SR environment representation 701C.

As an illustrative example, FIGS. 7A-7E correspond to an SR map associated with media content data including an electronic book about a child searching for his mother. A device selects an SR map representation 710 of a paper map as a default SR map representation. At a first time in the book, the mother is at work at an office and the child is at home. The device detects the word "office" in association with the mother, selects the first SR environment representation 701A of an office building, and associates the first object representation 720A with the first SR environment representation 701A and the first time. Similarly, the device detects the word "home" in association with the child, selects the fifth SR environment representation 701E of a house, and associates the second object representation 720B with the fifth SR environment representation 701E and the first time.

At a second time in the book, the mother goes to lunch and the child searches for his mother at the police station. The device detects the word "lunch", selects the second SR environment representation 701B of a restaurant, and associates the first object representation 720A with the second SR environment representation 701B and the second time. Similarly, the device detects the words "police station" in association with the child, selects the fourth SR environment representation 701D of a police station, and associates the second object representation 720B with the fourth SR environment representation 701D and the second time.

At a third time in the book, the mother (having received a missed call from the police station) goes to the police station. However, at the third time in the book, the police have escorted the child home. The device detects the words "police station" in association with the mother and associates the first object representation 720A with the fourth SR environment representation 701D and the third time. Similarly, the device detects the words "home" in association with the child and associates the second object representation 720B with the fifth SR representation 701E and the third time.

At a fourth time in the book, the mother (having been told by the police that the child was escorted home) returns to lunch. However, at the fourth time in the book, the child searches for his mother at the restaurant. The device detects the words "lunch" in association with the mother and associates the first object representation 720A with the second SR environment representation 701B and the fourth time. Similarly, the device detects the words "restaurant" in association with the child and associates the second object representation 720B with the second SR representation 701B and the fourth time.

At a fifth time in the book, the mother and child having been reunited, go out for ice cream together. The device detects the words "ice cream" in association with the mother and the child, selects the third SR environment representation 701C of an ice cream parlor, and associates both the first object representation 720A and the second object representation 720B with the third SR environment representation 701C and the fifth time.

Figure 8A:
FIG. 8A illustrates a media content object in accordance with some implementations.

FIG. 8A illustrates a media content object 810 in accordance with some implementations. The media content object 810 includes media content data 812 associated with a timeline, such as video, audio, and/or text. The method content object 810 includes metadata 811 describing the media content data, such as a title, author, genre, or year-of-release of the media content data.

In various implementations, event indicators are embedded in the metadata 811 indicating the time in the timeline of events. In various implementations, the media content data 812 includes event markers representing a plurality of events of a story arc. In various implementations, the event markers are portions of the media content data 812 meeting event marker criteria.

In various implementations, the event markers are detected by image analysis of video content data. For example, in some embodiments, the event marker criteria include a criterion that is met when an object is detected in an image of the video content data (e.g., a building, a skyline, or a planet). In some embodiments, the event marker criteria include a criterion that is met when the color palette of an image is significantly different than a previous image (e.g., indicating a scene change).

In various implementations, the event markers are detected by audio analysis of audio content data (or the audio component of video content data). For example, in some embodiments, the event marker criteria include a criterion that is met when a musical cue is detected. In some embodiments, the event marker criteria include a criterion that is met when the volume of the audio breaches a threshold or a rate of change of the volume breaches a threshold.

In various implementations, the event markers are detected by textual analysis of text content data (or text recognized from audio content data or the audio component of video content data). For example, in some embodiments, the event marker criteria include a criterion that is met when certain words are detected (e.g., one or more words meeting event marker word criteria).

In various implementations, a device determines, from the media content data based on the event markers embedded therein, a plurality of event definitions. In some embodiments, the plurality of event definitions is stored as an event table.

Figure 8B:
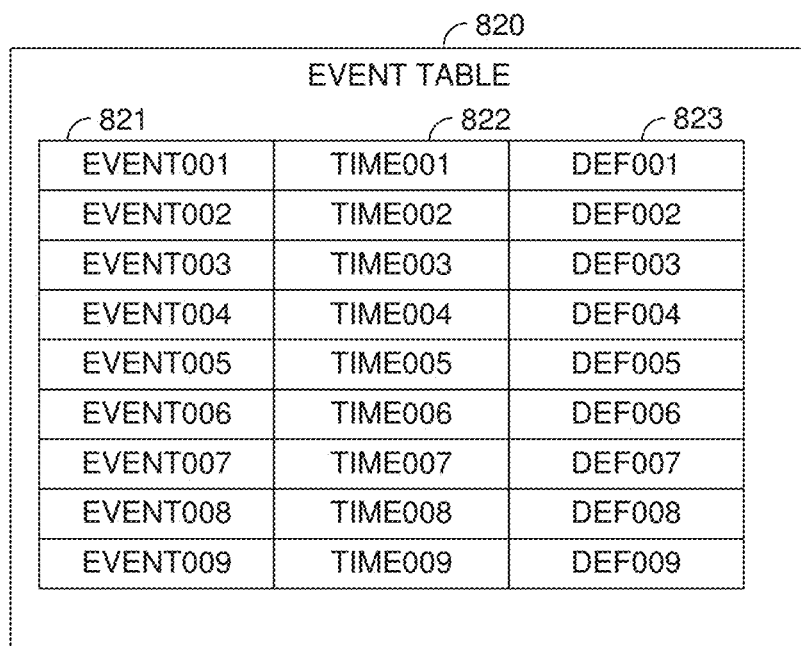
FIG. 8B illustrates an event table in accordance with some implementations.

FIG. 8B illustrates an event table 820 in accordance with some implementations. The event table 820 includes a plurality of entries respectively associated with a plurality of events. Each entry includes an event identifier 821 of the event, an event time 822 in the timeline of the event, and an event definition 823 of the event.

In various implementations, the event identifier 821 is a unique name or number of the event. In various implementations, the event definition 823 indicates which event marker criterion (or criteria) was met. For example, in various implementations, the event definition 823 indicates that a building was detected in an image of video content data at the event time 822. As another example, in various implementations, the event definition 823 indicates that a dramatic music cue was detected in audio content data at the event time 822. As another example, in various implementations, the event definition 823 indicates that the word "police station" was detected in text content data at the event time 822.

In various implementations, a device generates an SR map object based, in part, on the event table 820.

Figure 8C:
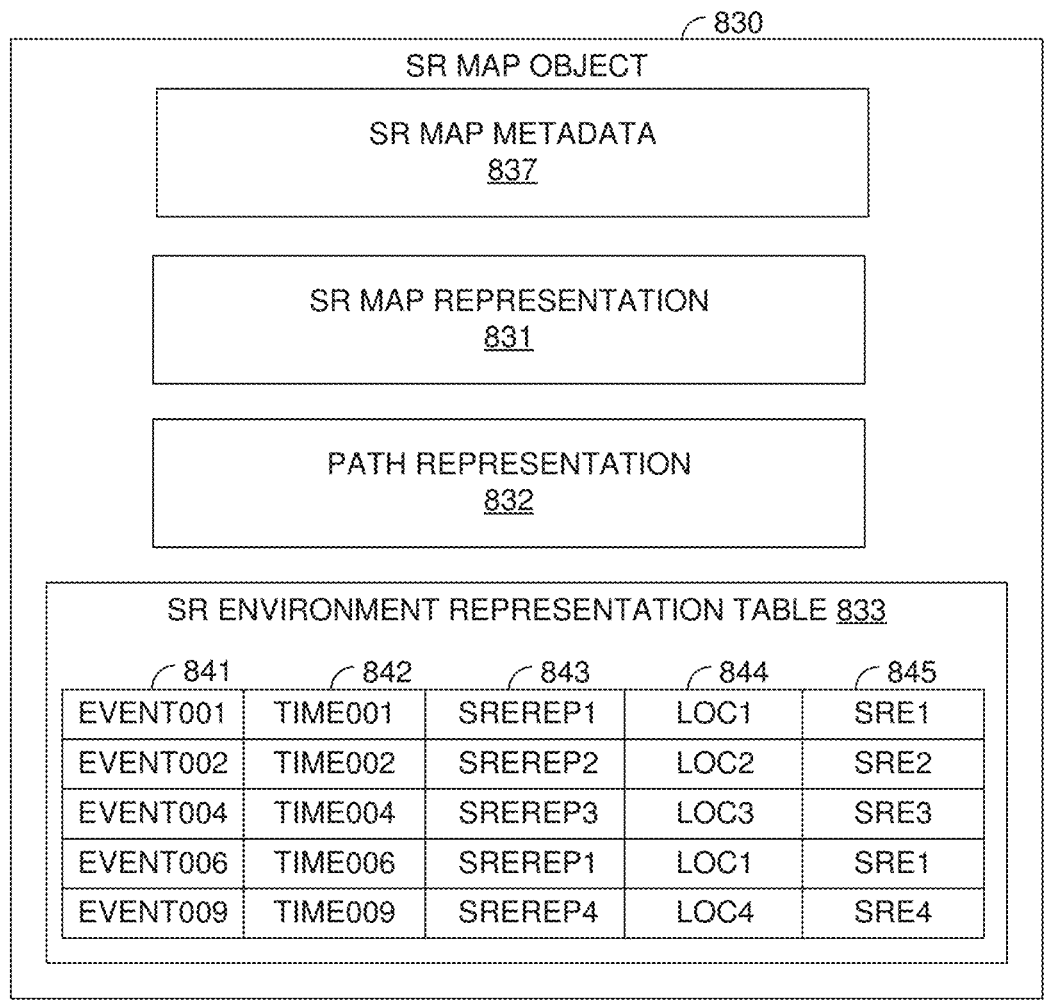
FIG. 8C illustrates an SR map object in accordance with some implementations.

FIG. 8C illustrates an SR map object 830 in accordance with some implementations. The SR map object 830 includes an SR map metadata field 837 including metadata for the SR map object 830. In various implementations, the metadata indicates the media content data to which the SR map corresponds. In various implementations, the metadata indicates a date and/or time the SR map object 830 was created and/or modified.

The SR map object 830 includes an SR map representation field 831 including data indicative of an SR map representation. In various implementations, the SR map representation field 831 includes an SR map representation, such as the SR map representation 510 of FIG. 5A or the SR map representation 710 of FIG. 7A. In various implementations, the SR map representation field 831 includes a reference to an SR map representation that is stored separate from the SR map object 830, either locally with the SR map object 830 or remotely on another device, such as a network server.

The SR map object 830 includes a path representation field 832 including data indicative of a path. The path includes a set of ordered locations (e.g., with reference to the SR map representation or an SR coordinate space). In various implementations, the number of ordered locations is more (e.g., ten times or a hundred times) than the number of entries in the event table 820.

The SR map object 830 includes an SR environment representation table 833 including a plurality of entries, each entry corresponding to one of the entries of the event table 820. In various implementations, the number of entries of the SR environment representation table 833 is less than the number of entries of the event table 820. For example, in various implementations, no entry in the SR environment representation table corresponds to a particular entry of the event table 820.

Each entry of the SR environment representation table 833 includes an event identifier 841 of the corresponding entry of the event table 820 and an event time 842 of the corresponding entry of the event table 820. Each entry of the SR environment representation table 833 includes an SR environment representation field 843 including data indicative of an SR environment representation. In various implementations, the SR environment representation field 843 includes an SR environment representation, such as the SR environment representations 501A-501E of FIG. 5F or the SR environment representations 710A-710E of FIG. 7A. In various implementations, the SR environment representation field 843 includes a reference to an SR environment representation that is stored separate from the SR map object 830, either locally with the SR map object 830 or remotely on another device, such as a network server.

Each entry of the SR environment representation table 833 includes an SR environment representation location field 844 including data indicating the location of the SR environment representation (e.g., with reference to the SR map representation or an SR coordinate space). Because the SR environment representations are located along the path, each location in the SR environment representation location fields 844 is a location of the set of ordered locations of the path indicated by the path representation field 832.

Each entry of the SR environment representation table 833 includes an SR environment field 845 including data indicative of an SR environment corresponding to the SR environment representation. In various implementations, the SR environment field 845 includes an SR environment, such as the third SR environment 520 of FIG. 5D. In various implementations, the SR environment field 845 includes a reference to an SR environment that is stored separate from the SR map object 830, either locally with the SR map object 830 or remotely on another device, such as a network server.

Figure 9:
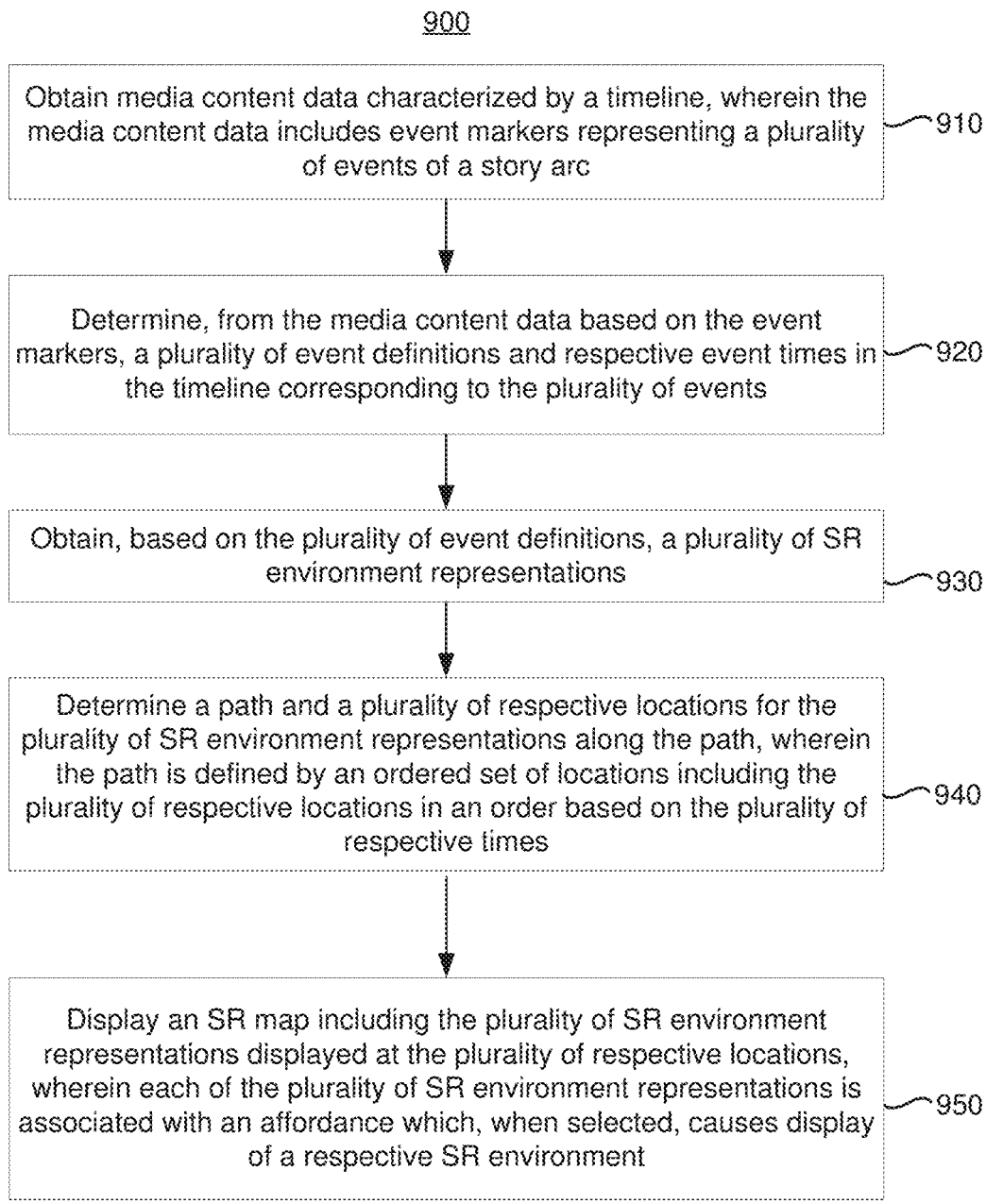
FIG. 9 is a flowchart representation of a method of generating an SR map in accordance with some implementations.

FIG. 9 is a flowchart representation of a method 900 of generating an SR map in accordance with some implementations. In various implementations, the method 900 is performed by a device with one or more processors and non-transitory memory (e.g., the HMD 120B of FIG. 3 or electronic device 410 of FIG. 4). In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins, in block 910, with the device obtaining media content data characterized by a timeline, wherein the media content data includes event markers representing a plurality of events of a story arc.

In various implementations, the media content data is characterized by a timeline such that, at various times, corresponding portions of the media content data are to be presented. In some embodiments, the media content includes video content data characterized by a timeline such that, at various times, corresponding images are to be displayed while, optionally, sound corresponding to the corresponding images is concurrently played. In some embodiments, the media content data includes audio content data in which corresponding sound is to be played at corresponding times. In various implementations, the audio content data includes music and/or spoken word narration. In some embodiments, the media content data includes text content data characterized by a timeline either by virtue of the character position of the various portions of text in the text content data or the estimated text-to-speech time (if read by a text-to-speech module) of the various portions of text in the text content data.

In various implementations, the event markers are portions of the media content data meeting event marker criteria. For example, in some embodiments, the event marker criteria include a criterion that is met when an object is present in an image of the video content data (e.g., a building, a skyline, or a planet). In some embodiments, the event marker criteria include a criterion that is met when the color palette of an image is significantly different than a previous image (e.g., indicating a scene change).

For example, in some embodiments, the event marker criteria include a criterion that is met when a musical cue is present. In some embodiments, the event marker criteria include a criterion that is met when the volume of the audio breaches a threshold or a rate of change of the volume breaches a threshold.

For example, in some embodiments, the event marker criteria include a criterion that is met when certain words and/or phrases are present (e.g., one or more words meeting event marker word criteria).

The method 900 continues, at block 920, with the device determining, from the media content data based on the event markers, a plurality of event definitions and respective event times in the timeline corresponding to the plurality of events.

In various implementations, the device determines an event definition and respective event time by detecting an event marker in the media content. In various implementations, the event markers are detected by image analysis of video content data. In various implementations, the event markers are detected by audio analysis of audio content data (or the audio component of video content data). In various implementations, the event markers are detected by textual analysis of text content data (or text recognized from audio content data or the audio component of video content data). In various implementations, the device detects an event marker by determining that a portion of the media content data associated with the particular time in the timeline meets particular event marker criteria.

In various implementations, the device determines an event definition and respective event time by determining the event definition indicating the particular event marker criteria and determining the respective event time as the particular time. For example, in various implementations, the event definition indicates that a building was detected in an image of video content data at the respective event time. As another example, in various implementations, the event definition indicates that a dramatic music cue was detected in audio content data at the respective event time 822. As another example, in various implementations, the event definition indicates that the word "police station" was detected in text content data at the respective event time.

The method 900 continues, at block 930, with the device obtaining, based on the plurality of event definitions, a plurality of SR environment representations. In various implementations, a first SR environment representation is obtained based on a first event definition. For example, in some embodiments, the first SR environment representation is selected from a plurality of stored (either locally or remotely from the device) SR environment representations based on the first event definition. For example, when the first event definition indicates that the word "Washington Monument" was detected, the device obtains an SR environment representation of the Washington Monument. As another example, when the first event definition indicates that a building was detected in an image of video content data of the media content data, the first SR environment representation is generated based on the image of the video content data of the media content data. Accordingly, in various implementations, the first SR environment representation is generated based on the media content data.

In some circumstances, the number of SR environment representations is less than the number of event definitions. For example, in some embodiments, the event definition indicates that a dramatic musical cue is detected at a respective event time, but no suitable SR environment can be generated from the corresponding video. As another example, in some embodiments, multiple event definitions correspond to the same SR environment representation. For example, in some embodiments, a first event definition indicates that the word "home" was detected at a first event time and a second event definition indicates that the word "home" was detected at a second event time. In response, the device may obtain a single SR environmental representation for both event definitions.

The method 900 continues, at block 940, with the device determining a path and a plurality of respective locations for the plurality of SR environment representations, wherein the path is defined by an ordered set of locations including the plurality of respective locations in an order based on the plurality of respective event times.

In various implementations, as an example, the path includes, in order, a start location, a first location, a second location, a third location, and an end location. In some embodiments, the path includes a plurality of locations between the start location and the first location, a plurality of locations between the first location and the second location, a plurality of locations between the second location and the third location, and/or a plurality of locations between the third location and end location. Accordingly, the second location is further along the path than the first location and the third location is further along the path than the second location.

The plurality of respective event times includes a first event time associated with a first event definition associated with a first SR environment representation, a second event time (later than the first event time) associated with a second event definition associated with a second SR environment representation, and a third event time (later than the second event time) associated with a third event definition associated with a third SR environment representation.

In various implementations, determining the path and the plurality of respective locations includes determining the path and determining the plurality of respective locations after determining the path. For example, in various implementations, the device obtains an SR map representation (e.g., the SR map representation 510 of FIG. 5A), which includes a predefined path (e.g., corresponding to the path representation 511). After obtaining the predefined path, the device determines the plurality of respective locations as locations of the path.

Further to the example above, the device selects a location of the path (e.g., the first location) as the first respective location of the first SR environment representation, selects a location further along the path (e.g., the second location) as the second respective location of the second SR environment representation because the second SR environment representation is associated with a later time than the first SR representation, and selects a location even further along the path (e.g., the third location) as the third respective location of the third SR environment representation because the third SR environment representation is associated with a later time than the second SR representation. In various implementations, the distance along the path is proportional to the amount of time between the start of the timeline and the respective event time.

In various implementations, determining the path and the plurality of respective locations includes determining the plurality of respective locations and determining the path after determining the plurality of respective locations. For example, in various implementations, the device obtains an SR map representation (e.g., the SR map representation 710 of FIG. 7A) and determines the plurality of respective locations. In some embodiments, the SR map representation includes predefined candidate locations and the device selects the plurality of respective locations from the predefined candidate locations. In some embodiments, the device determines the plurality of respective locations randomly. In some embodiments, the device determines the plurality of respective locations according to a space-packing algorithm. After obtaining the plurality of respective locations, the device determines the path through the plurality of respective locations in an order based on the plurality of respective event times.

Further to the example above, the device determines the first location of the path as the location of the first SR environment representation, determines the second location of the path as the location of the second SR environment representation because the second SR environment representation is associated with a later time than the first SR representation, and determines the third location of the path as the location of the third SR environment representation because the third SR environment representation is associated with a later time than the second SR representation.

In various implementations, the path returns to the same location at different points along the path. For example, in FIG. 7E, the first path representation 730A passes through the location of the second SR environment representation 701B twice. Accordingly, in various implementations, the path is defined by a set of ordered locations that include the same location two or more times. For example, in various implementations, the path includes, in order, a first location of a first SR environment representation associated with a first event time, a second location of a second SR environment representation associated with a second event time later than the first event time, and a third location the same as the first location because the first SR environment representation is further associated with a third event time later than the second event time. For example, a first event definition is associated with the first event time and the first SR environment representation and a third event definition is associated with the third event time and, also, the first SR environment representation.

In various implementations, determining the path and the plurality of respective locations includes determining the path and the plurality of respective locations simultaneously (e.g., iteratively choosing the path and the plurality of respective locations).

The method 900 continues, at block 950, with the device displaying an SR map including the plurality of SR environment representations displayed at the plurality of respective locations, wherein each of the plurality of SR environment representations is associated with an affordance which, when selected, causes display of a respective SR environment.

For example, in FIG. 5F, the electronic device 410 displays an SR map 409 including the plurality of SR environment representations 501A-501E displayed at the plurality of respective locations. Further, each of the plurality of SR environment representations is associated with an affordance when, when selected, causes display of a respective SR environment (e.g., the third SR environment 520 of FIG. 5D). As another example, in FIG. 7E, the electronic device 410 displays an SR map 609 including the plurality of SR environment representations 701A-701E displayed at the plurality of respective locations.

In various implementations, displaying the SR map includes displaying a path representation of the path. In some embodiments, the path representation is embedded in the SR map representation.

In various implementations, displaying the SR map includes generating the SR map. For example, in various implementations, the device generates a SR map object, such as the SR map object 830 of FIG. 8C. In various implementations, the device generates an SR map rendering (e.g., an image or overlay) that can be displayed on a display.

In various implementations, displaying the SR map includes concurrently presenting the media content data according to the timeline. In some embodiments, displaying the SR map includes displaying respective ones of the plurality of SR representations at corresponding ones of the plurality of respective times in the timeline.

In various implementations, the method 900 includes receiving user input indicative of a selection of an associated affordance of a particular one of the plurality of SR environment representations and, in response to receiving the user input, displaying the corresponding SR environment.

In various implementations, displaying the corresponding SR environment includes ceasing to display the SR map. In various implementations, displaying the corresponding SR environment includes pausing playback of the media content data. In various implementations, displaying the corresponding SR environment includes displaying at least one virtual object based on the media content data.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device including a processor and non-transitory memory:
   obtaining media content data characterized by a timeline, wherein the media content data represents a plurality of events;
   determining, from the media content data, a plurality of event definitions and a plurality of respective event times in the timeline corresponding to the plurality of events;
   obtaining, based on the plurality of event definitions, a plurality of event representations;
   determining a path and a plurality of respective locations along the path for the plurality of event representations, wherein the path is defined by an ordered set of locations including the plurality of respective locations in an order based on the plurality of respective event times; and
   displaying a map including the plurality of event representations displayed at the plurality of respective locations along the path.

2. The method of claim 1, wherein the media content data includes at least one of video content data, audio content data, or text content data.

3. The method of claim 1, wherein determining a first event definition of the plurality of event definitions comprises performing, using the processor, image analysis of video content data.

4. The method of claim 3, wherein performing image analysis of the video content data includes detecting an object in an image of the video content data.

5. The method of claim 1, wherein determining a first event definition of the plurality of event definitions comprises performing, using the processor, audio analysis of audio content data.

6. The method of claim 1, wherein determining a first event definition of the plurality of event definitions comprises detecting, using the processor, one or more words in text content data.

7. The method of claim 1, wherein obtaining a first event representation of the plurality of event representations based on a first event definition of the plurality of event definitions includes selecting the first event representation from a plurality of stored event representations based on the first event definition.

8. The method of claim 1, wherein obtaining a first event representation of the plurality of event representations based on a first event definition of the plurality of event definitions includes generating the first event representation based on the media content data.

9. The method of claim 1, wherein determining the path and the plurality of respective locations includes determining the path before determining the plurality of respective locations and determining the plurality of respective locations after determining the path.

10. The method of claim 1, wherein determining the path and the plurality of respective locations includes determining the plurality of respective locations before determining the path and determining the path after determining the plurality of respective locations.

11. The method of claim 1, wherein displaying the map includes concurrently presenting the media content data according to the timeline and displaying respective ones of the plurality of event representations at corresponding ones of the plurality of respective times in the timeline.

12. The method of claim 1, further comprising:
   receiving user input indicative of a selection of a particular event representation of the plurality of event representations; and
   in response to receiving the user input, displaying content associated with a particular one of the plurality of events corresponding to the particular one of the plurality of event representations.

13. The method of claim 12, wherein the content associated with the particular one of the plurality of events is based on the media content data.

14. A device comprising:
   a non-transitory memory; and
   one or more processors to:

obtain media content data characterized by a timeline, wherein the media content data represents a plurality of events;

determine, from the media content data, a plurality of event definitions and a plurality of respective event times in the timeline corresponding to the plurality of events;

obtain, based on the plurality of event definitions, a plurality of event representations;

determine a path and a plurality of respective locations along the path for the plurality of event representations, wherein the path is defined by an ordered set of locations including the plurality of respective locations in an order based on the plurality of respective event times; and display a map including the plurality of event representations displayed at the plurality of respective locations along the path.

15. The device of claim 14, wherein the one or more processors are to determine a first event definition of the plurality of event definitions by performing image analysis of video content data.

16. The device of claim 15, wherein the one or more processors are to perform image analysis of the video content data by detecting an object in an image of the video content data.

17. The device of claim 14, wherein the one or more processors are to display the map by concurrently presenting the media content data according to the timeline and displaying respective ones of the plurality of event representations at corresponding ones of the plurality of respective times in the timeline.

18. The device of claim 14, wherein the one or more processors are further to:

receive user input indicative of a selection of a particular event representation of the plurality of event representations; and in response to receiving the user input, display content associated with a particular one of the plurality of events corresponding to the particular one of the plurality of event representations.

19. The device of claim 18, wherein the content associated with the particular one of the plurality of events is based on the media content data.

20. A non-transitory computer-readable medium having instructions encoded thereon which, when executed by one or more processors of a device, cause the device to:

obtain media content data characterized by a timeline, wherein the media content data represents a plurality of events;

determine, from the media content data, a plurality of event definitions and a plurality of respective event times in the timeline corresponding to the plurality of events;

obtain, based on the plurality of event definitions, a plurality of event representations;

determine a path and a plurality of respective locations along the path for the plurality of event representations, wherein the path is defined by an ordered set of locations including the plurality of respective locations in an order based on the plurality of respective event times; and display a map including the plurality of event representations displayed at the plurality of respective locations along the path.

* * * * *